United States Patent [19]

Shaw

[11] Patent Number: 5,927,088
[45] Date of Patent: *Jul. 27, 1999

[54] BOOSTED AIR SOURCE HEAT PUMP

[76] Inventor: David N. Shaw, 200 D Brittany Farms Rd., New Britain, Conn. 06053

[ * ] Notice: This patent issued on a continued prosecution application filed under 37 CFR 1.53(d), and is subject to the twenty year patent term provisions of 35 U.S.C. 154(a)(2).

[21] Appl. No.: 09/069,351

[22] Filed: Apr. 29, 1998

Related U.S. Application Data

[63] Continuation of application No. 08/806,696, Feb. 26, 1997, abandoned, which is a continuation-in-part of application No. 08/607,707, Feb. 27, 1996.

[51] Int. Cl.$^6$ .................................. F25B 7/00; F25B 1/10
[52] U.S. Cl. .............................. 62/175; 62/196.2; 62/510
[58] Field of Search .................................. 62/196.2, 175, 62/510

[56] References Cited

U.S. PATENT DOCUMENTS

| 2,243,541 | 5/1941 | Swart . |
| 2,352,581 | 6/1944 | Winkler . |
| 2,646,212 | 7/1953 | Kellie . |
| 2,663,164 | 12/1953 | Kurtz . |
| 2,938,361 | 5/1960 | McNatt . |
| 3,074,249 | 1/1963 | Henderson . |
| 3,226,949 | 1/1966 | Gamache . |
| 3,500,962 | 3/1970 | Kocher . |
| 3,719,057 | 3/1973 | Grant . |
| 3,775,995 | 12/1973 | Conley et al. . |
| 3,785,169 | 1/1974 | Gylland, Jr. . |
| 3,859,815 | 1/1975 | Kasahara . |
| 4,197,719 | 4/1980 | Shaw . |
| 4,205,537 | 6/1980 | Dubberley . |
| 4,236,876 | 12/1980 | Fraser et al. . |
| 4,268,291 | 5/1981 | Cann . |
| 4,306,420 | 12/1981 | Cann . |
| 4,332,144 | 6/1982 | Shaw ........................................ 62/324.1 |
| 4,594,858 | 6/1986 | Shaw ........................................ 62/175 |

(List continued on next page.)

FOREIGN PATENT DOCUMENTS

| 0 106 414 | 4/1984 | European Pat. Off. . |
| 0 715 077 A2 | 6/1996 | European Pat. Off. . |
| 06213170 | 2/1994 | Japan . |

OTHER PUBLICATIONS

Theory of Mechanical Refrigeration, N.R. Sparks, McGraw Hill, 1938 (pp. 111–127).

J.L. Threlkeld, Thermal Environmental Engineering, Prentice–Hall, Inc. ©1970, 1962 (pp. 63–69).

Survey And Comparison Of Interstage Cooling Systems For Two Stage Compression, Data Sheet, No. 20, May 1979.

E.G. Pita, Refrigeration Principles and Systems, Business News Publishing Company, 1991 (pp. 243–245).

B.D. Wood, Applications Of Thermodynamics, Waveland Press, Inc., ©1982 (pp. 218–222).

S.M. Elenka and Q.W. Minich, Standard Refrigeration and Air Conditioning Questions & Answers, McGraw Hill, ©1983, 1973, 1961 (pp. 28–31, 50–53).

I. Cerepnalkowski, Modern Refrigerating Machines, Elsevier Science Publishers, B.V., ©1991 (pp. 47,48).

A Technical Handbook From SWEP, 1993 (1 page plus cover and back sheets).

Primary Examiner—William Wayner
Attorney, Agent, or Firm—Cantor Colburn LLP

[57] ABSTRACT

A boosted air source heat pump system is presented having a primary compressor, a booster compressor and an economizer. On activation of the heat pump system, the primary compressor is operated. When the primary compressor cannot meet the demand, the booster compressor is activated, but only upon receipt of a signal enabling the operation of the booster compressor. The booster compressor is preferably a variable speed booster, and its speed is controlled to be at or between an absolute minimum speed and an absolute maximum speed. The booster may be on the low side or the high side of the primary compressor. The operation of the economizer may be modulated to meet the demand on the system.

135 Claims, 19 Drawing Sheets

HEAT PUMP WITH BOOSTER COMPRESSOR
(HEATING FLOW PATH SHOWN)

U.S. PATENT DOCUMENTS

| | | | |
|---|---|---|---|
| 4,748,820 | 6/1988 | Shaw | 62/175 |
| 4,787,211 | 11/1988 | Shaw | 62/117 |
| 4,833,893 | 5/1989 | Morita . | |
| 4,947,655 | 8/1990 | Shaw | 62/200 |
| 5,062,274 | 11/1991 | Shaw . | |
| 5,094,085 | 3/1992 | Irino . | |
| 5,095,712 | 3/1992 | Narreau . | |
| 5,236,311 | 8/1993 | Lindstrom . | |
| 5,410,889 | 5/1995 | Sjoholm et al. . | |
| 5,626,027 | 5/1997 | Dormer et al. . | |

PRIOR ART HEAT PUMP

(HEATING FLOW PATH SHOWN)

PRIOR ART HEAT PUMP WITH ECONOMIZER
(HEATING FLOW PATH SHOWN)

HEAT PUMP WITH BOOSTER COMPRESSOR

(HEATING FLOW PATH SHOWN)

HEAT PUMP
WITH BOOSTER COMPRESSOR
(COOLING FLOW PATH SHOWN)

Self Contained
(HEATING FLOW PATH SHOWN)
HEAT PUMP WITH BOOSTER

HEAT PUMP WITH BOOSTER COMPRESSOR

(HEATING FLOW PATH SHOWN)

HEAT PUMP WITH BOOSTER

(HEATING FLOW PATH SHOWN)

(BREAKOUT FROM FIG. 13)

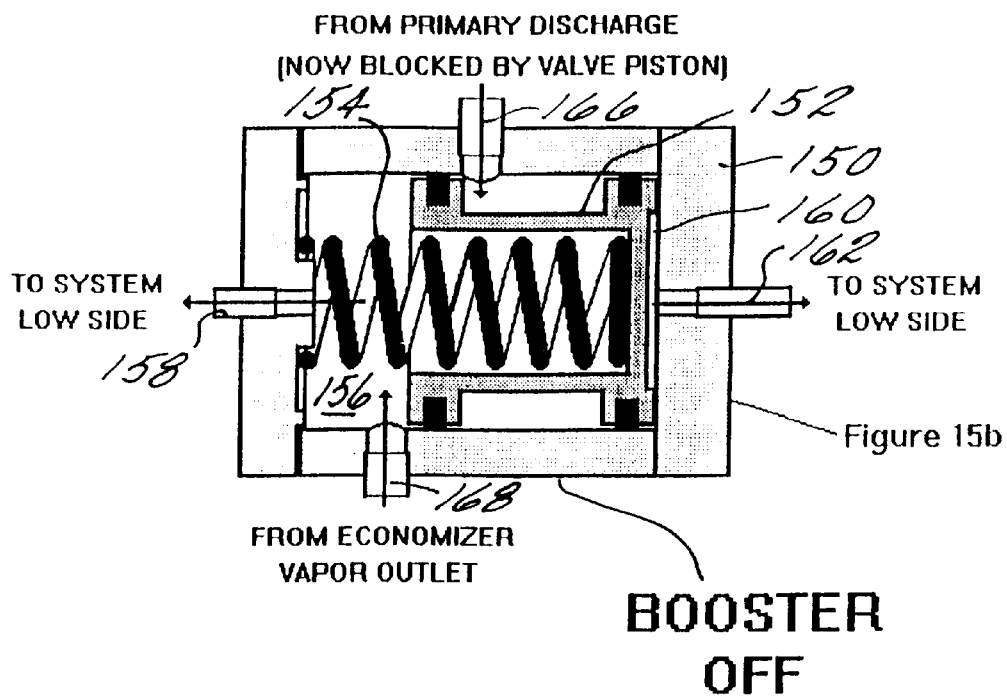
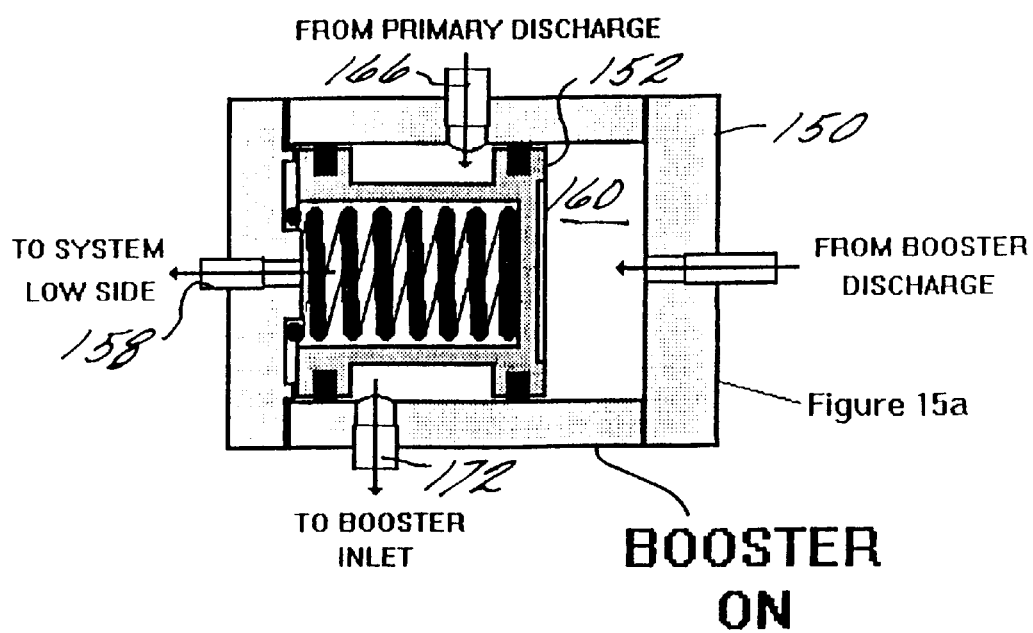
Figure 15

BOOSTED AIR SOURCE HEAT PUMP

CROSS REFERENCE TO RELATED APPLICATIONS

This application is a continuation of U.S. application Ser. No. 08/806,696 filed Feb. 26, 1997 now abandoned, which, in turn, is a continuation-in-part of U.S. application Ser. No. 08/607,707, filed Feb. 27, 1996.

BACKGROUND OF THE INVENTION

This invention relates to air-source heat pumps. More particularly, this invention relates to a new and improved air source heat pump especially suitable for use in normally colder climates.

The air-source heat pump system is the most prevalent type of heat pump used in the world today. This is the case whether one is discussing room units, residential central type, ductless splits, or rooftop commercial systems.

Although the air-source concept in general has a high application potential worldwide, its popularity in the United States and elsewhere has been greatest in mild climate areas. This is because the compressor-derived heating capacity of conventional units declines rapidly as the outdoor ambient falls, due, in the most part, to the large increase in specific volume (i.e., decrease in density) of the outdoor coil generated refrigerant vapor as ambient (outdoor) temperature falls (see FIG. 2). This fall in compressor-derived heating capacity is obviously opposite to the heating requirement, which generally increases in proportion to the fall in outdoor ambient temperature. This problem is illustrated in FIG. 1, which shows a plot of heating requirements vs. outdoor ambient temperature and the heating performance of a 3 Ton Lennox HP 22-411 fixed speed scroll compressor heat pump system. As shown in FIG. 1, the heating requirements (line 2) increase as ambient temperature decreases, going from zero (0) BTU/hr at 65° F. to 72,000 BTU/hr at 5° F. outdoor ambient temperature. The compressor derived heating capacity is shown at line 4.

When a typical prior art heat pump operates below its balance point, (about 40° F. in FIG. 1), supplemental heating is required. The most prevalent form of supplemental heat used is electric resistance. In other than mild climates, this use of supplemental electric resistance heat puts the air-source heat pump at an economic disadvantage to a consumer as compared with other forms of heating, because of the high cost of electric resistance heating. Electric utilities are also concerned because of the associated high peak power demand during cold weather.

One of the areas for improvement of air source heat pump systems lies in the efficient recovery of the low grade heat energy remaining in the condensed refrigerant liquid leaving the system condenser. If this remaining energy is recovered and then returned to the heating side of the system, rather than being further thermally degraded and sent to the system evaporator (as is now the case), very significant increases in overall compressor-derived heating capacity can be made.

The basic problem here is that after the refrigerant has been fully liquified in the condenser, there is still a large amount of energy left in the warm liquid. This remaining energy serves to evaporate a large portion of the liquid itself during the normal pressure reduction process that occurs across the system expansion device. Depending on the refrigerant utilized, and the temperatures existing between the evaporator and the condenser, as much as one-half, or even more, of this liquid can be evaporated during the normal pressure reduction process across the system expansion device. Obviously if liquid has already evaporated, it cannot be again evaporated in the system evaporator, and thus cannot absorb energy from the outside air. However, the net resulting vapor must pass through the system evaporator anyway, creating additional pressure drop along its way, and then must be fully compressed to the condensing level by the compressor. If the compressor must induct this useless vapor, it can only induct a smaller amount of useful vapor. However, compressor power must be expended to compress the total amount of vapor that has been inducted into the compressor. This is not a reasonable process for air-source heat pumps operating in other than the milder ambient temperatures.

Referring again to FIG. 1, the required heat input to an occupied space (line 2) increases in direct proportion to the fall in outdoor ambient temperature whereas the compressor derived heating capacity (line 4) declines rapidly. This is because the heat output of any heat pump is essentially proportional to the weight flow of refrigerant vapor entering the system condenser. FIG. 2 shows what happens to the specific volume of evaporator generated refrigerant vapor as the evaporating temperature falls. At a 50° F. outdoor ambient supporting a 40° F. evaporating temperature, the specific volume is about 0.46 cubic feet per pound of generated vapor whereas at 0° F. outdoor ambient with an evaporating temperature of −25° F., the specific volume is 1.6 cubic feet per pound of generated vapor. This is 3.5 times the volume of vapor per pound compared to the 50° F. ambient level. Further to this, more than 4 times the amount of heat is required at 0° F. as is required at 50° F. This means that a dramatic increase of refrigerant vapor is required at 0° F. ambient as compared to 50° F. ambient in order to adequately match the heat energy requirement.

In addition, if the entire space heating requirement at 0° F. outdoor ambient is to be supplied by compressor derived heating capacity, the air flow across the heating coil of the condenser must be such that the indoor delivered air temperature will be at least 110° F. in order to provide adequate freedom from a sensation of cool drafts. This in turn will cause the system condensing temperature to rise to about 140° F. considering a reasonably sized indoor coil surface. The end result of all this is to cause overall system operating compression ratios to rise to the point where it becomes unrealistic to even consider the use of present day technology for such an application.

The various factors presented above clearly show that present day air source heat pumps do not even come close to doing the job that is required for efficient heating in cold climates.

SUMMARY OF THE INVENTION

In order for air-source heat pumps to become a more effective contender for use in colder climates, significant changes must be made for the heat pump to realize its true potential. Fundamental Carnot thermodynamic principles unquestionably show that electric powered air source heat pumps indeed do have significant potential in cold climates. In fact, the theoretical Carnot C.O.P. (coefficient of performance) for a sink (room) temperature of 70° F. and a source (outside air) temperature of −10° F. is 6.62 (Carnot C.O.P.=$(T_2 \Delta S)/[T_2-T_1)\Delta S]$ where $T_2$ is the delivered energy sink temperature (room temperature in absolute degrees) and $T_1$ is the supplied energy source temperature (outside air temperature in absolute degrees) and $\Delta S$ is change in entropy. It is feasible with the present invention to deliver an actual C.O.P. of at least 2.40 at this −10° F. outdoor ambient condition. This represents a Carnot efficiency level of only 36% which certainly is within the bounds of rational achievability. In prior art systems, the actual delivered C.O.P. is only about 1.07 at this condition (70° F. room temperature, −10° F. outside air temperature) because most of the delivered energy comes from electric resistance heating coils, which (by definition) operate with a C.O.P. of 1.

A first embodiment of the present invention is directed to a refrigeration circuit which comprises at least one first stage compressor (sometimes referred to as a booster compressor), at least one second stage compressor (sometimes referred to as a primary compressor), a condenser, an economizer, an evaporator, and conduit means bearing a compressible refrigerant working fluid and connecting the first stage compressor, the second stage compressor, the condenser, the economizer, and the evaporator, in series and in that order, in a closed loop. The conduit means further comprises means for bleeding a portion of the condensed refrigerant from the closed loop downstream of the heating condenser and expanding it within the economizer for highly subcooling the liquid refrigerant within the closed loop being fed to the evaporator. The expanded refrigerant from the economizer is delivered to a point between the outlet of the first stage compressor and the inlet to the second stage compressors. Means are also provided for expanding the highly subcooled high pressure liquid refrigerant downstream of the economizer at the evaporator. The subcooling of the liquid refrigerant in the economizer significantly increases the capacity of the refrigerant to absorb heat in the evaporator. Motors are provided for driving the compressors, and the system includes means for first energizing the primary compressor motor and inhibiting booster operation unless the primary is both running and its inlet pressure has reached a satisfactory low value to enable booster operation. In accordance with this invention, the first stage booster compressor is preferably driven at a variable speed to effect a large variation in flow rate of the refrigerant passing therethrough, and the second stage primary compressor can be relatively fixed in volume flow handling capacity (i.e., a fixed speed compressor), or it can be a two speed or a variable speed machine. A control system includes a first transducer for sensing outdoor ambient temperature, a second transducer for sensing interstage pressure of the refrigerant circulating in the closed loop for controlling the speed of the first stage booster compressor such that control is achieved for booster speed until the interstage pressure reaches a predetermined value determined from outdoor ambient temperature, and a third transducer for sensing the temperature of the air leaving the condenser. The control system also responds to primary and secondary thermostats to operate the primary and booster compressors.

Any or all of the compressors may be positive displacement machines of any type. The first stage booster compressor may also be a variable speed centrifugal compressor for larger size systems.

In a second embodiment of this invention, the booster is a single speed compressor (although a two speed booster could also be used), and the operation of the economizer is modulated to add capacity to the system. In this second embodiment, as in the first embodiment the booster is on the low side of the primary compressor. In this second embodiment, the booster, of appropriately chosen size, is brought on line when the outdoor ambient temperature drops sufficiently to allow operation of the booster. The economizer is physically in the system, but operation of the economizer is inhibited initially. Subsequently, when additional system capacity is required, the economizer is operated to supply this additional required capacity. The economizer can be operated all at once, i.e., to its full capacity in an on/off mode to add the full additional capacity to the system in one step; or the economizer can be brought on line in a series of steps infinitely modulated to add incremental capacity to the system as required.

In a third embodiment of this invention, the primary compressor is on the low side of the system and the booster compressor is on the high side of the system. In this embodiment, the first pressure stage compressor is the primary compressor, and it is a variable speed compressor. The second pressure stage compressor is the booster compressor, and it is either a fixed speed or a two speed compressor. In this third embodiment the first pressure stage (primary) compressor operates whenever the system is in operation (i.e., for heating or for cooling). The second pressure stage (secondary) compressor (i.e., single speed) only operates on the heating cycle, and it is prevented from operating until the outdoor ambient temperature drops sufficiently low to warrant its use.. As with the second embodiment, economizer operation could also be modulated to meet system capacity requirements.

In the first and second embodiments, the primary compressor handles most or all of the cooling cycle. Accordingly, in those embodiments the cooling operation is essentially effected with a single or two speed machine. However, the third embodiment has the advantage that most or all of the cooling operation can also be effected with a variable speed compressor.

It is to be noted that in all embodiments, the first compressor to be operated is designated as the "primary" compressor, and the second compressor to be operated is designated as the "booster" compressor. This is true, regardless of whether the booster is on the low side of the system (first and second embodiments) or on the high side of the system (third embodiment).

BRIEF DESCRIPTION OF THE DRAWINGS

FIGS. 15a and 15b show two positions of the isolation valve of FIG. 14 embodiment of this invention.

PRIOR ART

Figure 1:
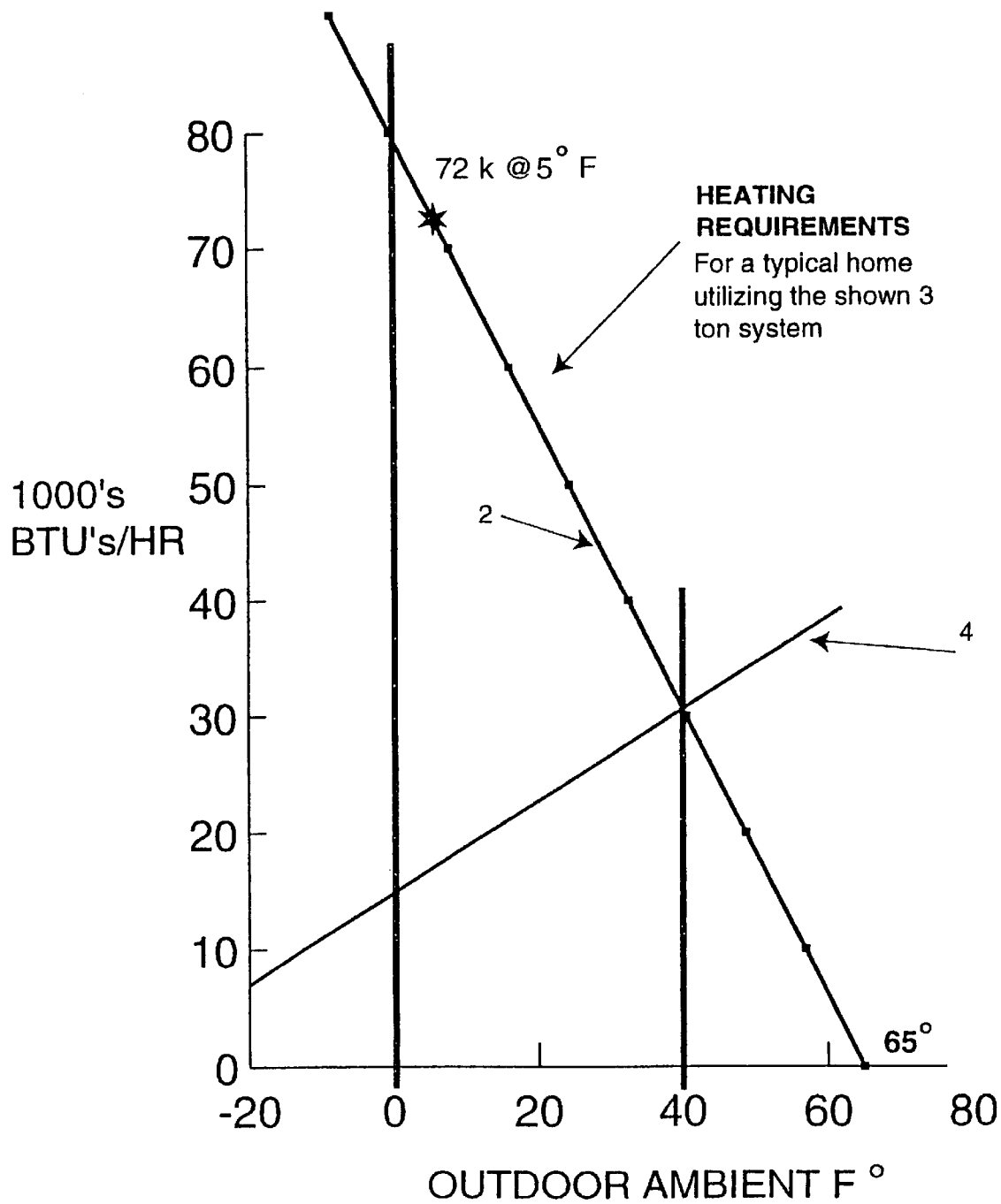
FIG. 1 is a plot of heating requirements versus outdoor ambient temperatures for a typical heat pump system.
Figure 2:
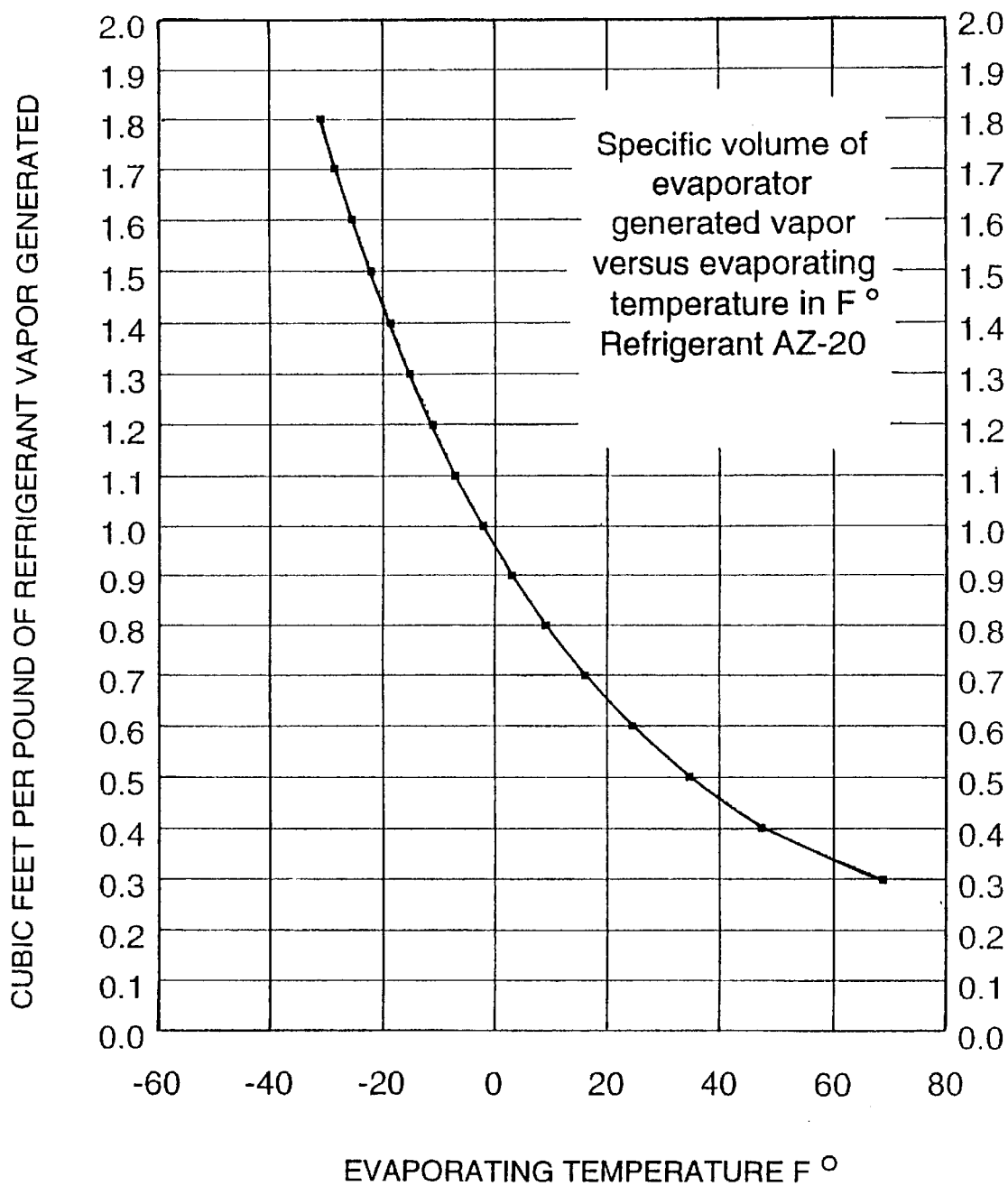
FIG. 2 is a plot showing the specific volume of evaporator generated vapor versus actual evaporating temperature in °F.
Figure 3:
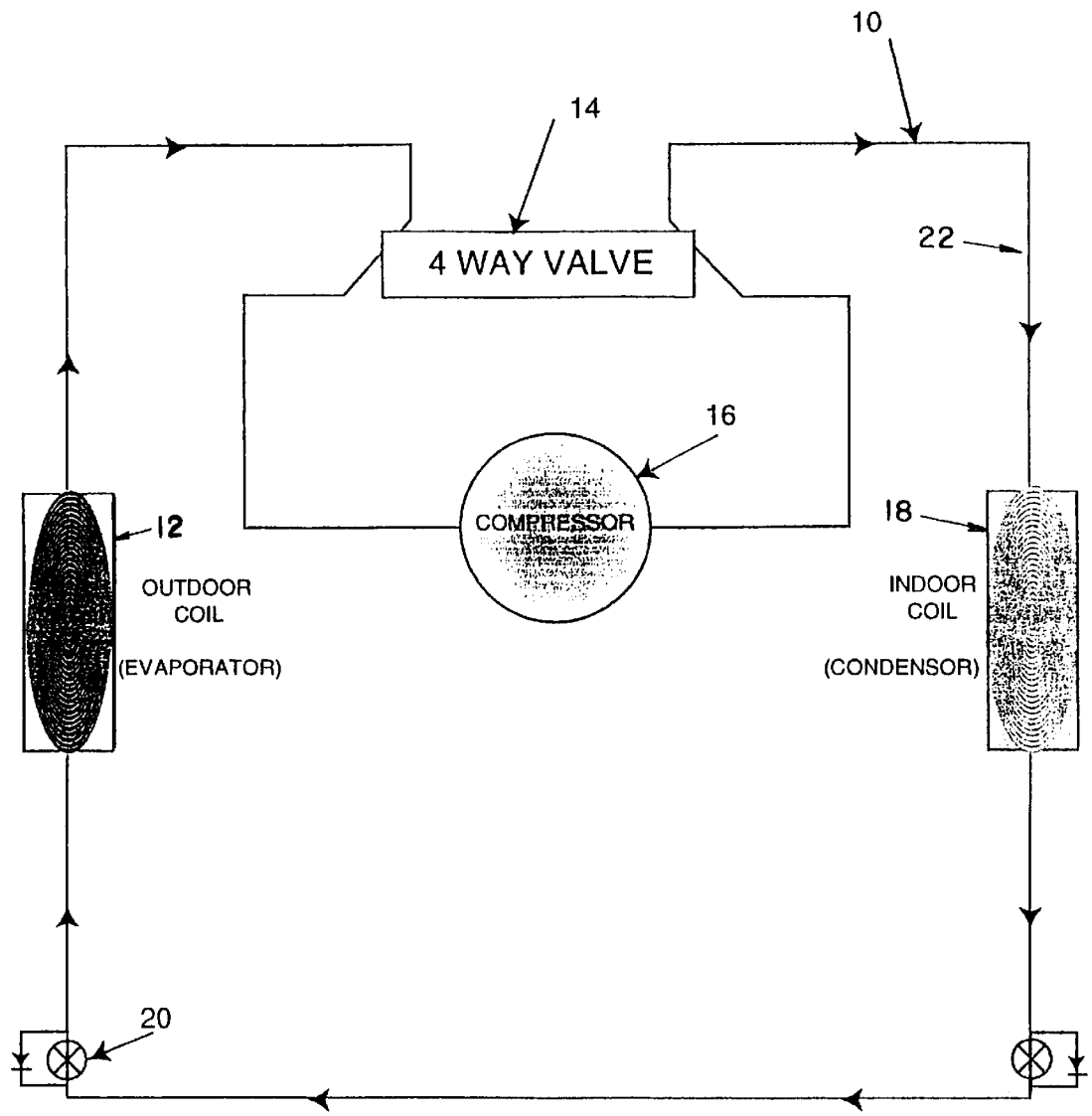
FIG. 3 is a prior art heat pump system.
Figure 4:
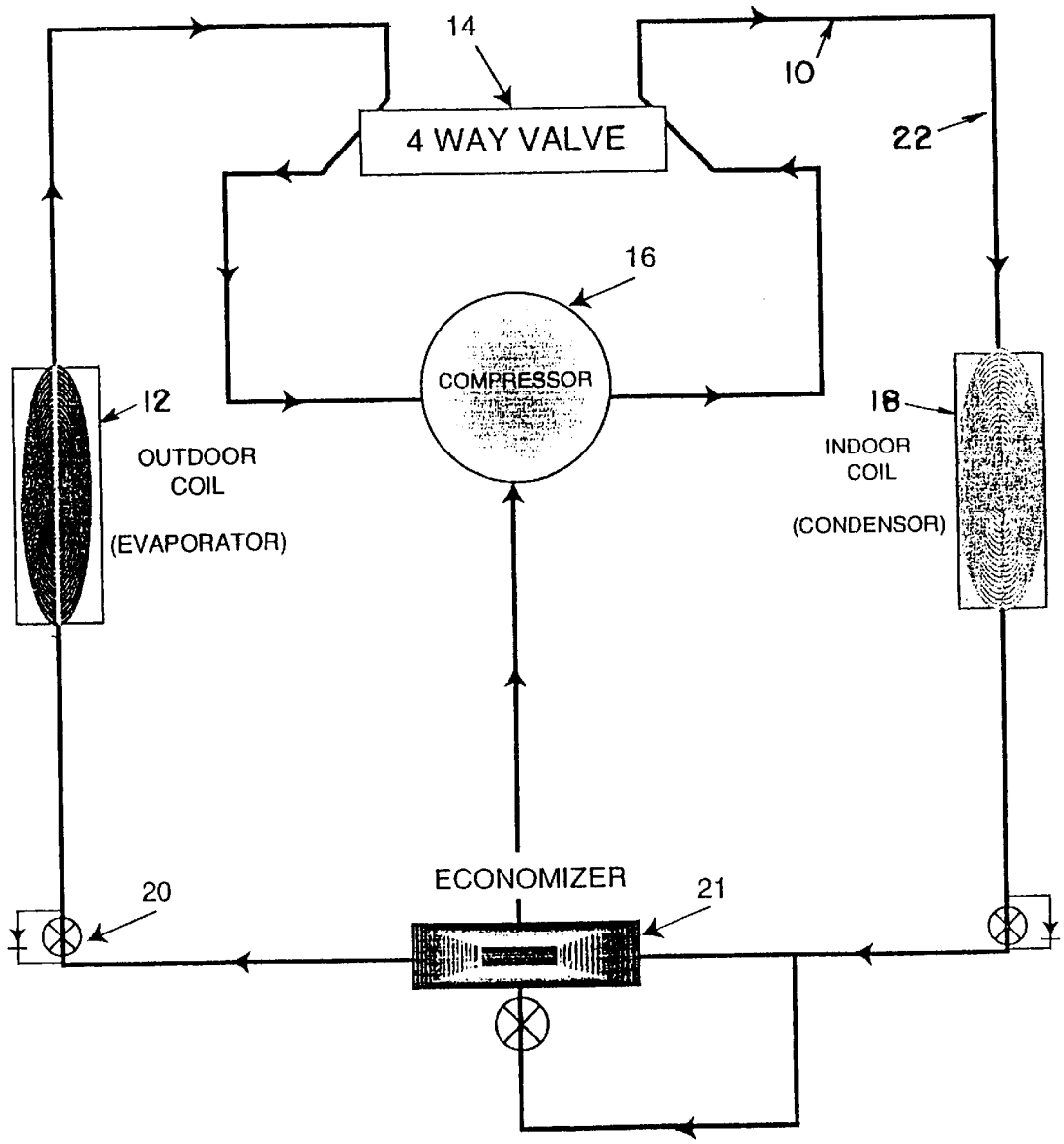
FIG. 4 is another prior art heat pump system.

Before describing the preferred embodiments of the present invention, the prior art systems of FIGS. 3 and 4 will be briefly described. FIG. 3 shows a typical prior art heat pump system 10 having an outdoor coil (evaporator) 12, a four way valve 14, a compressor 16, an indoor coil (condenser) 18, and an expansion valve 20. Conduit means 22 connects these components as shown in a closed loop system or cycle. A thermal fluid or refrigerant circulates through the closed loop system. Compressor 16 can be any type of positive displacement machine, and it is typically a reciprocating compressor. For heat pump operation, energy is picked up in outdoor coil 12, which functions as an evaporator, the thermal level and content are increased by compressor 16, and the energy is transferred by indoor coil 18, which is functioning as a condenser, to the medium to be heated. As is well known in the art, the system can also function as an air conditioning system, with the functions of evaporator 12 and condenser 18 being reversed.

FIG. 4 shows the prior art heat pump system of U.S. Pat. No. 4,332,144. This heat pump system employs an economizer 21 to improve the performance of the heat pump system. However, the heat pump system of FIG. 4 and U.S. Pat. No. 4,332,144 employs only a single compressor, with the economizer bleed line being connected to that single compressor to deliver the bleed fluid at the end of the compressor intake stroke. The present invention differs significantly in that it employs two compressors (primary and booster) in series, with the economizer bleed line being connected to a point between the two compressors for delivery to the intake to the primary compressor. Furthermore, the heat pump system of U.S. Pat. No. 4,332,144 requires modification of the compressor to admit the bleed fluid at the end of the intake stroke, whereas the heat pump system of the present invention can employ conventional compressors without any need for modification. While the invention of U.S. Pat. No. 4,332,144 was an improvement in heat pump systems, it is still not sufficiently economically practical for normally colder northern climates where ambient temperatures are often below 35° F.

The prior art systems of FIGS. 3 and 4 are shown in U.S. Pat. No. 4,332,144, the entire contents of which are incorporated herein by reference.

U.S. Pat. No. 4,594,858 discloses a refrigeration system having two compressor stages in series and an economizer, with the bleed line of the economizer connected to a point between the two compressor stages. While there are structural similarities between the refrigeration system of U.S. Pat. No. 4,594,858 and the heat pump system of the present invention, the system of U.S. Pat. No. 4,594,858 is limited to a refrigeration system, and it cannot function as a heat pump. The system of U.S. Pat. No. 4,594,858 is dealing with a refrigeration case of essentially constant temperature, and that refrigerated space is itself in an environment of essentially constant temperature, e.g., an air conditioned supermarket. In the refrigeration system of U.S. Pat. No. 4,594,858, the specific volume (or density) of the refrigerant vapor is essentially constant. By way of contrast, and as pointed out above, the heat pump system of the present invention must function in an environment (i.e., the outside ambient air) where the temperature can vary from 100° F. or higher to 0° F. or lower. And, the present invention must deal with a specific volume of refrigerant vapor that varies over a wide range of 6:1 or more. In addition, the control system and the operation of the heat pump of the present invention are very different than the refrigeration system of U.S. Pat. No. 4,594,858.

DESCRIPTION OF THE PREFERRED EMBODIMENTS

Figure 5:
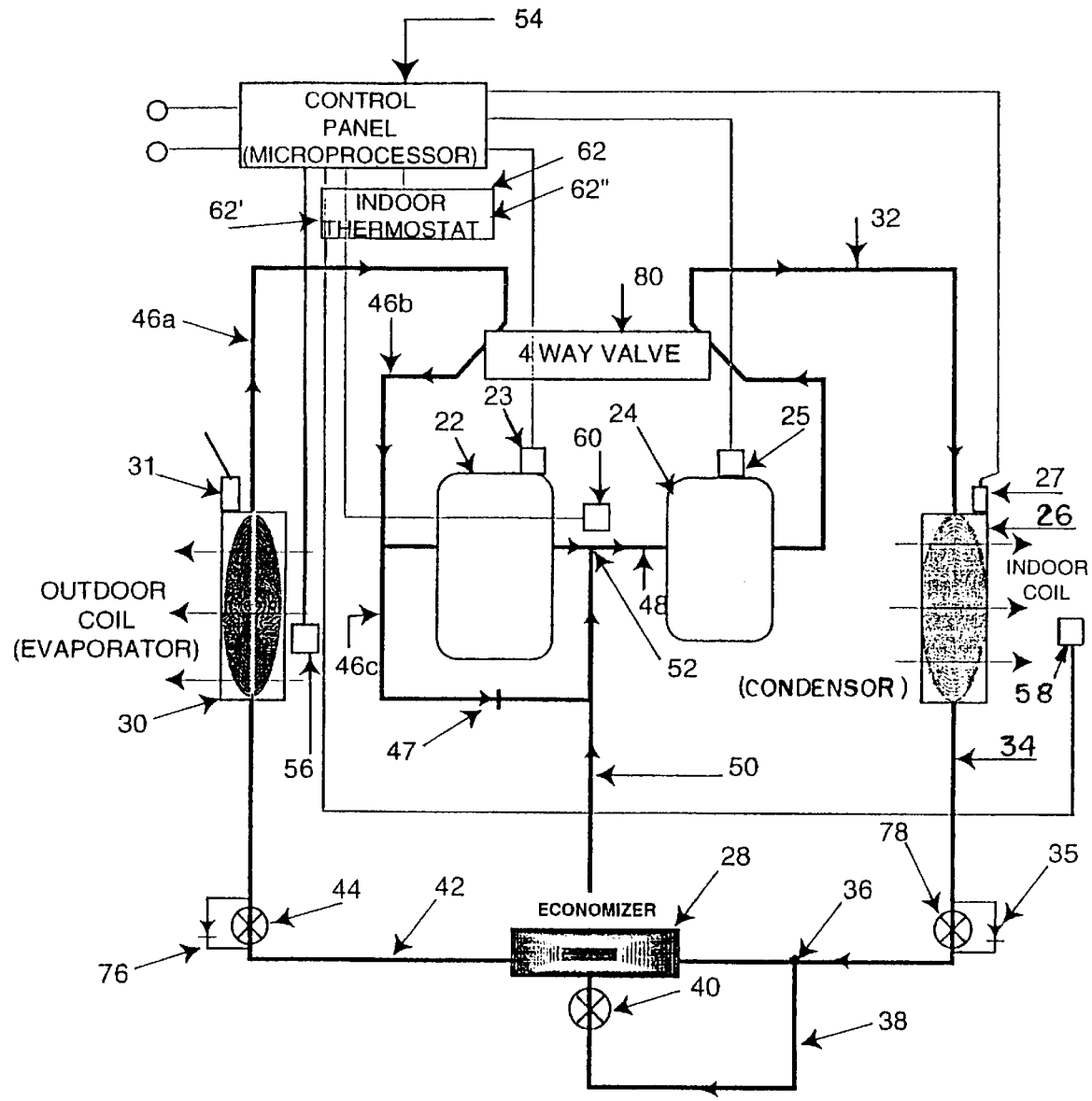
FIG. 5 is a schematic diagram of a closed loop boosted air source heat pump system forming a preferred embodiment of the present invention.
Figure 6:
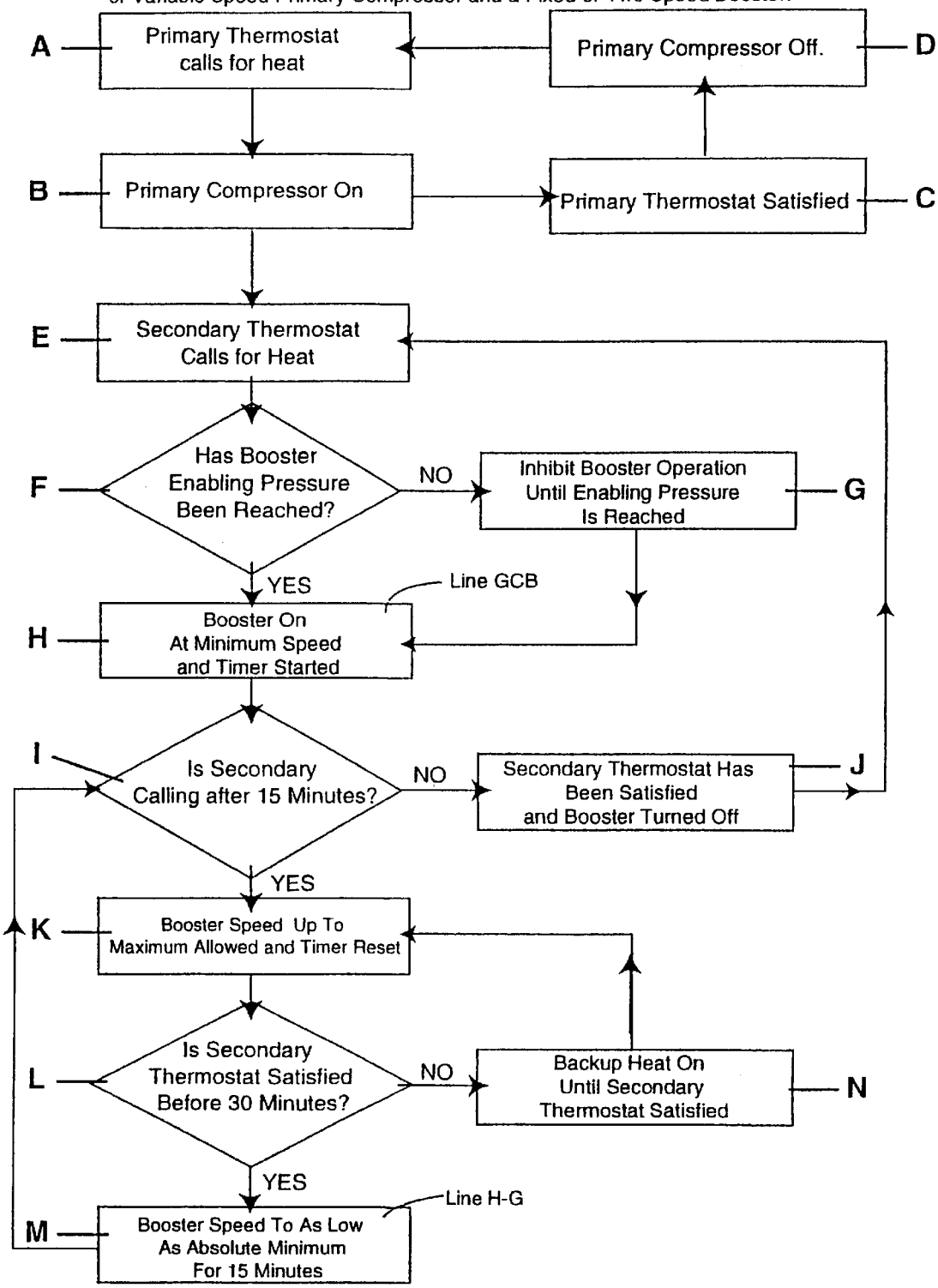
FIG. 6 is a flow chart of the preferred control system for the boosted heat pump system of FIG. 5.

Referring to FIGS. 5 and 6, there is shown a closed loop heat pump system and control forming a preferred embodiment of the present invention. Referring first to FIG. 5, the closed loop system includes a first or booster stage compressor 22, a second or high stage primary compressor 24, an indoor coil or condenser 26 which delivers heated air to a space to be heated, an economizer 28, and an outdoor coil or evaporator 30 which, together with conduit means interconnecting these elements in a closed loop circuit, are basic components of the closed loop heat pump system. High stage or primary compressor 24 is normally operating whenever the heat pump system is delivering energy, but booster compressor 22 is operated only when the ambient temperature approaches or falls below the balance point for the primary compressor. Warm output vapor of the primary or second stage compressor 24 is fed to the inlet of indoor coil 26 via conduit segment 32 to warm air (indicated by the arrows) flowing over indoor coil 26 for delivery to the indoor space to be heated. A variable speed fan 27 normally causes the flow of air over indoor coil 20. The warm vapor is, of course, cooled and condensed in indoor coil 26. The outlet of indoor coil 26 delivers the condensed refrigerant to flow via conduit segment 34 and check valve 35 to the economizer 28. At point 36 in line 34, a bypass or bleed line 38 permits a portion of the liquid refrigerant to be bled from the primary closed loop circuit and to expand via an expansion valve 40 preceding economizer 28. The expansion of this bleed refrigerant within economizer 28 results in significant subcooling of the liquid refrigerant which flows in a closed conduit through economizer 28. This subcooled liquid refrigerant then passes directly to evaporator 30 via conduit segment 42. This highly subcooled liquid refrigerant expands via expansion valve 44 into and within the evaporator 30 to perform the function of absorbing energy from the outside air flowing over outdoor coil 30 (as indicated by the arrows) and vaporizing in evaporator 30. A fixed speed fan 31 delivers the air to flow over outdoor coil 30. The amount of energy absorbed within evaporator 30 is greatly increased because of the highly subcooled refrigerant delivered from economizer 28 to the evaporator. The refrigerant vapor from evaporator 30 then flows via conduit segment 46a, 46b and 46c and check valve 47 to point 52 and via conduit segment 48 to the suction or low side of primary compressor 24 to complete the closed loop circulation in effect when only the primary compressor 24 is operating.

Meanwhile, the refrigerant bled via line 38 which vaporizes within the economizer to perform the cooling effect in the economizer, passes via conduit segment 50 to point 52 in conduit 48 connected to the inlet of the primary compressor 24. It should be noted that while only one second or high stage compressor 24 is shown, there may be two or more high stage compressors, connected in parallel and suitably controlled (and/or two or more booster compressors connected in parallel and suitably controlled).

Each of compressors 22 and 24 has its own internal motor, indicated at 23 and 25, respectively, to drive directly each compressor, with at least the motor for booster compressor 22 being a variable speed motor and preferably providing at least a five to one flow range for the refrigerant passing through compressor 22. In the embodiment of FIG. 5, the motor for primary compressor 25 is of fixed speed. The heat pump system as illustrated allows highly efficient heating to take place utilizing evaporator 30 under all load conditions due to the constant use of an economizer cycle. While primary compressor 24 is described as a fixed speed machine, it may be a two speed machine, and it may also be a variable speed machine. At least a two speed primary compressor is preferred in order that the interstage pressure variation remains optimal. Also, the primary or high stage machine, which may be a reciprocating compressor, does not normally mechanically unload and thus always operates at its peak efficiency. The booster first stage compressor 22 may be a variable speed reciprocating compressor, although it could be a variable capacity machine of almost any type including such as a variable speed screw compressor, variable speed sliding vane rotary compressor, etc. It will also be possible to use a variable high speed turbo compressor, i.e., centrifugal compressor for the booster. The goal of the system is to achieve the high heating capacity combined with the high heating and cooling efficiency.

The heat pump system of the present invention includes a microprocessor control 54, a temperature transducer 56 at outdoor coil 30 to sense the temperature of the outdoor air flowing over outdoor coil 30, a temperature transducer 58 at indoor coil 26 to sense the temperature of air leaving indoor coil 26, a pressure transducer 60 to sense the pressure of the refrigerant at point 52 between the exit from booster compressor 22 and the inlet to primary compressor 24, and an indoor thermostat 62 which senses the temperature in the space to be heated and sends signals to microprocessor 54 when heat is required or when the desired temperature has been attained. Thermostat 62 includes a primary thermostat 62' and a secondary thermostat 62".

Figure 7:
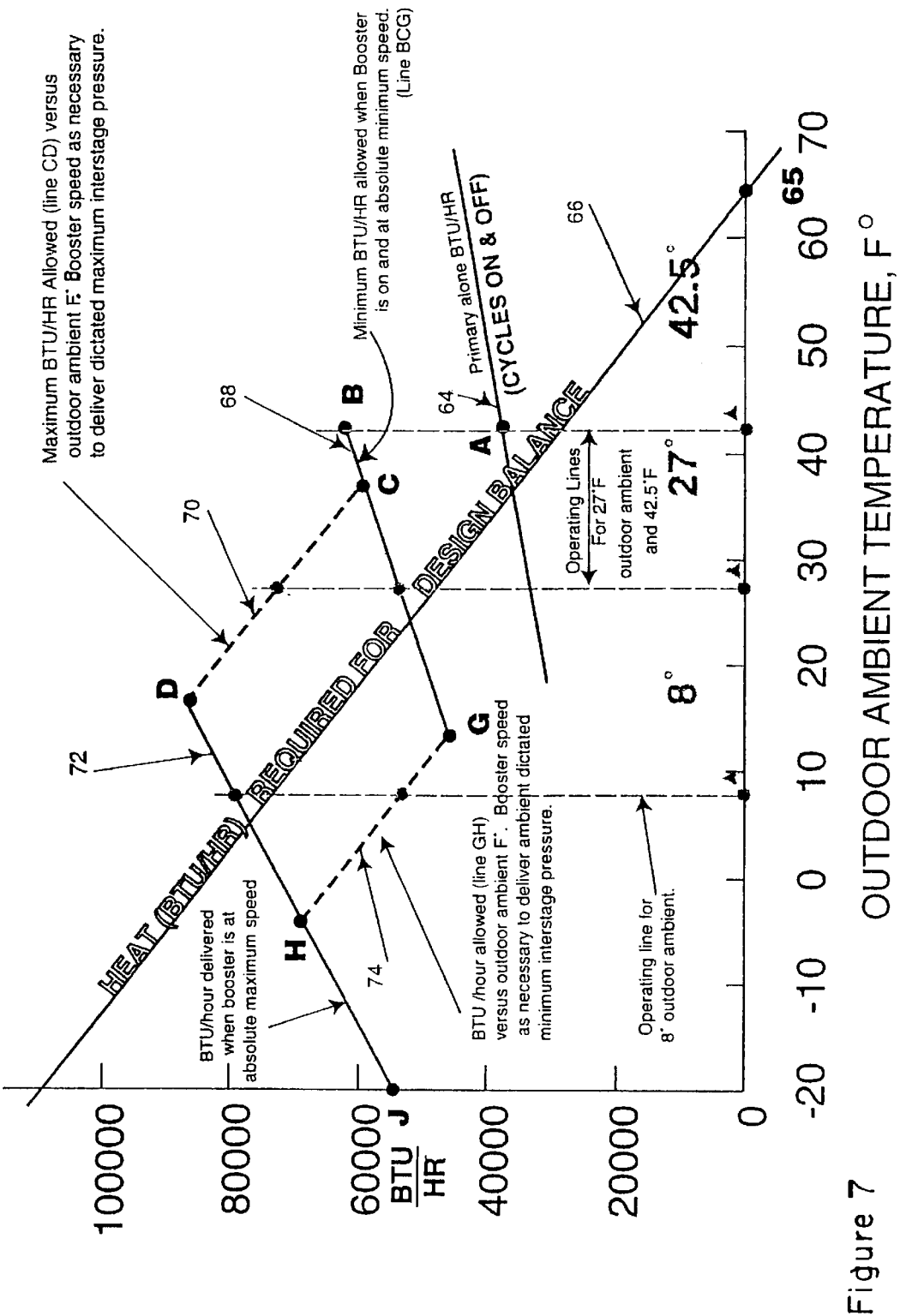
FIG. 7 is a plot illustrating aspects of the control system.

Referring now to FIG. 6, a logic system flow chart is shown for controller 54 and the heat pump system of this invention. Reference will also be made to FIG. 7, which is a plot illustrating aspects of the control system. If the temperature of space to be heated (e.g., the interior of a house) is at or above the desired temperature, both compressors 22 and 24 are off and there is no heat flow in the system. If the temperature of the space to be heated falls below the temperature set at primary thermostat 62', the thermostat will send a signal to control panel 54 calling for heat, see block A in FIG. 6. Controller 54 reacts to this signal from primary thermostat 62' by delivering a signal to primary compressor 24 to turn on motor 25 to operate compressor 24 (see block B of FIG. 6). Compressor 24 will then deliver compressed refrigerant vapor via conduit segment 32 to indoor coil 26 to heat the air flowing into the space to be heated, with the rest of the system functioning as previously described. The controller then continuously looks to see whether primary thermostat 62' is satisfied by the heat delivered to the space to be heated (block C of FIG. 6). Assuming that the operation of the primary compressor 24 supplies enough heat to satisfy primary thermostat 62', controller 54 delivers a signal to terminate the operation of primary compressor 24 (see block D of FIG. 6). During this foregoing control cycle, primary compressor 24 operates at a constant speed somewhere along line 64 of FIG. 7, depending on the outdoor ambient temperature, with primary compressor 24 cycling on and off to supply heat as needed. Line 64 is the heating capacity line relating the heating capacity of the system, in BTU's/HR, to outdoor ambient temperature which results with only constant speed compressor 24 in operation. The foregoing control cycle will continue for so long as the primary compressor alone is able to deliver enough energy to satisfy primary thermostat 62'.

By way of example, if it is desired to maintain an indoor temperature of 70° F., the design balance line 66 (heat required to maintain 70° F. inside) will be as shown in FIG. 7 (which indicates that no heat is required until outdoor ambient temperature drops to 65° F.). If the outdoor ambient temperature is above 42.5° F., the system will operate on line 64 at a point vertically above the outdoor ambient temperature point, with primary compressor 24 cycling on and off to supply the heat necessary to satisfy thermostat 64'. By way of further example, if thermostat 64' is set back to, e.g., 60° F. for night time operation, and if the outdoor ambient temperature drops to 50° F., eventually thermostat 64' will call for heating, and the primary compressor 24 will operate on line 64 at a point vertically above the 50° F. ambient outdoor temperature point until thermostat 64' is satisfied. (As those skilled in the art will understand, the design balance line will move left or right and parallel to that shown in FIG. 7 if the temperature to be maintained is lower or higher than the 70° F. of this example.)

While the foregoing control cycle could continue as long as primary compressor 24 is operating to the right of the design balance line 66 of FIG. 7, it is preferable to set the control system to call for operation of booster compressor 22 before actually reaching the design balance point for compressor 24 operating alone. That point is indicated at point A. This ensures that the system has a reserve heating capability over and above that which is needed just to achieve the balance point as the balance point is approached.

When the heat pump system is operating on primary compressor 24 alone, the primary compressor refrigerant suction pressure at point 52 (which is also referred to as the interstage pressure when booster 22 is operating as well) will drop with decreasing temperature of the ambient air. This pressure drop occurs because the boiling point of the refrigerant goes down as the ambient temperature drops. Conversely, this pressure will also rise with rising ambient air temperature when the system is operating on primary compressor 24 alone. This direct relationship between ambient air temperature and the refrigerant suction pressure is used to set (i.e., define) an enabling interstage pressure above which the system will not initiate operation of booster compressor 22. This avoids unnecessary operation of booster compressor 22 when the ambient temperature is high enough for primary compressor 24 to handle the heating load on its own, even though the primary thermostat has not been satisfied and the secondary thermostat has called for operation of the booster compressor. It should be noted that with only the primary compressor operating, the pressure at point 52 is, essentially, the pressure at the discharge of outside coil (evaporator) 30, which, in turn, is a function of outdoor ambient temperature. Accordingly, the booster enabling signal can be obtained either as a direct measurement of outdoor ambient temperature or a measurement of a parameter related to outdoor ambient temperature.

When indoor temperature drops to the point that the set temperature of secondary thermostat 62" is reached, secondary thermostat 62" sends a signal to controller 54 to call for operation of booster compressor 22 (block E of FIG. 6).

However, before initiating operation of booster compressor 22, controller 54 first looks at the refrigerant vapor pressure at point 52 between booster compressor 22 and primary compressor 24 as sensed by pressure transducer 60 (block F of FIG. 6). If this pressure is above the preselected enabling pressure, operation of booster compressor 22 is inhibited until the pressure at point 52 drops to the booster enabling pressure (see block G of FIG. 6). If operation of booster compressor 22 is inhibited because the pressure at point 52 is above the enabling pressure, only primary compressor 24 operates (along line 64) to supply the necessary heat energy.

When the refrigerant vapor at point 52 pressure falls to the predetermined booster enabling level, as sensed by transducer 60 (commensurate with a sufficiently low outdoor ambient temperature as shown by point A on FIG. 7), controller 54 sends a signal to turn on the variable speed motor 23 for booster compressor 22 to operate booster compressor 22 at its minimum permissible speed; and a timer is also started to count a preselected time interval, e.g., 15 minutes. In this example, the ambient temperature to achieve booster enabling pressure is chosen to be 42.5° F., a value which can be changed if desired. The reaching of booster enabling pressure is indicated at block H of FIG. 6. At this time booster compressor 22 initially operates at constant minimum speed at point B on line 68 of FIG. 7. As with line 64, line 68 is also a heating capacity line. Line 68 relates the system heating capacity in BTU's per hour, to outdoor ambient temperature when booster 22 is operating at absolute minimum speed. Operation of compressor 22 causes a pressure rise at point 52 which closes check valve 47 so the evaporated refrigerant from outdoor coil 30 then flows directly into booster compressor 22.

Assuming that the ambient temperature remains at 42.5° F., booster compressor 22 will continue to operate until secondary thermostat 62" is satisfied. Operation of the booster compressor will then be terminated, and the system will return to operation with only primary compressor 24 at point A, as previously described.

Assuming, now, that the outdoor ambient temperature has dropped to 27° F., primary compressor 24 will be operating at a capacity level below that needed for design balance. Therefore, secondary thermostat 62" will eventually call for heat, and that will cause operation of booster compressor 22 on line BG at the point of intersection of the vertical from 27° F. Since this point is above the design balance line, operation of booster compressor 22 at minimum speed should eventually satisfy secondary thermostat 62". During the selected time interval of block I, controller 55 is continuously looking to see whether secondary thermostat 62" has been satisfied. If it has, controller 54 will turn off booster compressor 22, and the control cycle will return to block E, with primary compressor 24 continuing to operate on line 64. At this point, the system will then cycle between operation of the primary compressor alone and operation of both the primary and booster compressors.

After the selected time interval has elapsed, controller 54 looks to see whether secondary thermostat 62" is still calling for heat (block I of FIG. 6). If, at the end of the selected time interval, secondary thermostat 62" is still calling for heat, then, as indicated at block K of FIG. 6, controller 54 initiates variable higher speed operation of booster compressor 22 to supply greater heating capacity to the system, with this higher speed being limited by the outdoor ambient temperature between an absolute minimum speed C and an absolute maximum speed D on line 72 which is the maximum allowed heating capacity line for the boosted system. This heating capacity at higher speed operation of the booster compressor is indicated along line 70, to which the system moves from line 68 upon initiation of variable speed operation of booster compressor 22. Also, at logic block K the system timer is reset to a second time interval higher than the time interval at block H (e.g., 30 minutes). Line 70 is a predetermined maximum heating capacity line for the boosted system (primary and booster operating) as related to outdoor ambient temperature for variable speed operation of booster compressor 22. If outdoor ambient temperature continues to fall, booster compressor 22 will be allowed to operate at ever increasing speeds to supply heating capacity to the system along line 70 until the maximum speed limit for compressor 22 is reached at point D on the intersection of lines 70 and 72; and the system will then operate along line 72 between points DJ at the maximum booster compressor speed. Line 72 is a heating capacity line relating the system heating capacity in BTU's per hour to outdoor ambient temperatures when booster 22 is operating at absolute maximum speed.

Assuming that the ambient outdoor temperature is constant, during the second time interval, booster compressor 22 will operate at a point on line 70 between points CD or on maximum speed line 72 at a point between points DJ of FIG. 7 to satisfy the demands of secondary thermostat 62".

When operation of booster compressor 22 is initiated, compressor interstage pressure (at point 52) rises, and this interstage pressure will increase with increasing speed of booster compressor 22. An algorithm in controller 54 relates the permitted or sensed compressor interstage pressure, as sensed by transducer 60, to outdoor ambient temperature. More particularly, set or permitted compressor interstage pressure is made to be inversely proportioned to ambient temperature, so that as the temperature sensed by outdoor coil transducer 62 gets colder, the compressor interstage pressure at point 58 is allowed to go higher. That, in turn, translates to an increased maximum speed for booster compressor 22 to add heat capacity to the system as ambient temperature falls when the system is operating along line 70.

During the second time interval controller 54 also looks to see whether the secondary thermostat has been satisfied (block L of FIG. 6). If so, then controller 54 reduces the speed of booster compressor 22 to that speed dictated by the outdoor ambient temperature. Depending on the outdoor ambient temperature, this may reduce the speed of booster 22 to a point on line 74 to an intermediate speed between the maximum booster speed at point H and the minimum booster speed at point G; or the controller may return booster compressor 22 to its absolute minimum speed along line 68, again depending on the outdoor ambient temperature (see FIG. 7), for a preselected time period, e.g., 15 minutes, (see block M of FIG. 6). The control cycle then returns to block I where the I, J, K, L, M cycle will be repeated. Line 74 is a predetermined minimum heating capacity line for the boosted system (primary and booster operating) as related to outdoor ambient temperature for variable speed operation of booster compressor 22.

If, at block L, the secondary thermostat is not satisfied before expiration of the preset second time period, e.g., 30 minutes, that means that the combined operation of the primary compressor and the booster compressor is not adequate to meet the demand on the heat pump system. In that case, controller 54 operates to turn on a source of back up heat (e.g., electric resistance heaters) until the secondary thermostat is satisfied, see block N of FIG. 6. The control cycle is then returned to block K of FIG. 6.

Assuming, now, that the outdoor ambient temperature has dropped to 8° F., primary compressor will be operating, and booster compressor 22 will be operating at the point of intersection of the vertical from 8° F. and line 72 (D-J). When the secondary thermostat is satisfied during the second time interval (logic block L), the speed of booster compressor 22 is reduced and the system operates on line 74 (H-G) at the point of intersection of the vertical from 8° F. Line 74 is a predetermined minimum heating capacity line for the boosted system (primary and booster operating) as related to outdoor ambient temperature. Booster compressor 22 then operates at the reduced speed (logic block M) for up to a predetermined time, e.g., 15 minutes, and the logic system returns to block I, where controller 54 looks to see if secondary thermostat 62" is satisfied. If the secondary thermostat is still calling for heat, the logic system continues to loop through steps K, L, M, I. However if, in any control loop, secondary thermostat 62" is not satisfied at step L, then a backup heat source (e.g., electrical resistance heat) is activated (see block N of FIG. 6). If the backup heat source is activated, booster compressor 22 continues to operate at maximum speed along with fixed speed operation of primary compressor 24. When backup heat operation is initiated, the control system cycles through steps N, K, L with booster 22 operating at maximum allowable speed until secondary thermostat 62" is satisfied (block L), whereupon the backup heat source is turned off and the control system then again cycles through steps L, M, I, K.

To rephrase some of the foregoing as to operation of booster compressor 22, the absolute minimum and maximum operating speeds of booster compressor 22 are set and controlled by the design of compressor 22. An algorithm in microprocessor 54 sets and varies the set or permissible interstage pressure in line 48 between the outlet from booster compressor 22 and the inlet to primary compressor 24 as a direct, but inverse, function of ambient air temperature as sensed by sensor 56. Once operation of booster compressor 22 is initiated, the interstage pressure in line 48 increases, and that pressure is sensed by sensor 60 which inputs the sensed pressure level to microprocessor 54. That sensed pressure is then compared to the set or permissible interstage pressure (which is a function of ambient air temperature), and speed of booster compressor 22 is permitted, i.e., caused, to increase above the minimum speed or decrease below the maximum speed until the interstage pressure sensed by sensor 60 equals the permitted interstage pressure determined by microprocessor 54 as a function of ambient air temperature.

Between points C and D on line 70, the algorithm sets the maximum allowable interstage pressure for any given ambient temperature (X° F.); and that allowable interstage pressure determines the speed along line CD to which booster compressor 22 will be allowed to increase at that X° F. outdoor ambient temperature. Thus, if operation of booster 22 at minimum speed on line 68 does not supply enough heat at X° F. ambient outdoor temperature, then the speed of booster compressor 22 will be permitted to increase to a speed commensurate with the point on line 70 vertically aligned with the value X° F.

If booster compressor 22 is operating at a speed commensurate with a point on line 70, i.e., at a speed between absolute minimum and absolute maximum, or if compressor 22 is operating at maximum speed commensurate with a point on line 72, and if the heating requirement, as determined by secondary thermostat 62", is satisfied, the speed of booster compressor 22 will, depending on outdoor ambient temperature, be reduced either to absolute minimum booster speed commensurate with a point on line 68, or to an intermediate speed between absolute maximum and absolute minimum commensurate with a point on line 74.

During the operation of the heat pump system, transducer 58 senses the temperature of the air coming off indoor coil 26. If the temperature of that air falls below a predetermined level, e.g. 110° F., controller 54 will reduce the speed of fan 27 (down to a predetermined minimum) to reduce the flow of air over indoor coil 26. Conversely, if the temperature of the air coming off indoor coil 26 rises above the predetermined level, controller 54 will increase the speed of fan 27 to increase the flow of air over indoor coil 26 (up to a predetermined maximum). This will have the effect of avoiding either cool or hot drafts in the space to be heated.

The control system of the present invention functions to increase the intake (or suction) to primary compressor 24 in a linear manner as the difference between outdoor ambient temperature and the controlled environment temperature increases, with the result being a linear increase in delivered heat. In the preferred embodiment disclosed herein, the pressure between booster compressor 22 and primary compressor 24, which is a function of the power input to booster compressor 22, is related to ambient outdoor temperature and is used as a control parameter. However, that compressor interstage pressure is not the only control parameter that can be used. In fact, any parameter of booster compressor operation related to power input to the booster can be used; and the ambient outdoor temperature is used to control the permissible level of the chosen parameter. Thus, as in the embodiment described herein, outdoor ambient temperature is used to set the permissible interstage pressure, which increases as power input to the booster compressor increases. Alternatively, the sensed outdoor ambient temperature can be used to set the permissible RPM of or kilowatt input to booster compressor 22, both of these parameters being related to power input to the booster and increasing as power input to the booster increases. One advantage of using booster RPM or booster kilowatt input as a control parameter is that the booster compressor drive usually includes sensors for both of these parameters. If a parameter such as booster RPM or booster kilowatt input is used, the outdoor ambient temperature can be used directly to set the booster enabling point. The control system would function to set permissible RPM or kilowatt input as an inverse function of ambient outdoor temperature, and the set parameter would be sensed to control booster compressor speed.

While a system with a variable speed booster compressor 22 and a fixed speed primary compressor has been described, other combinations of machines can be employed as long as the booster compressor is variable speed or some variable capacity combination, etc. The described system having a fixed speed primary compressor and a variable speed booster compressor may be the least expensive from a component cost standpoint. Alternatively, a system having a two speed primary compressor and a variable speed booster compressor may provide the ideal balance between component cost and operating efficiency. A system having both a variable speed primary compressor and a variable speed booster may be the most efficient from an operating standpoint, but may have a higher component cost.

It will also be understood that either or both of the single machine primary and booster compressors may be replaced by two or more machines connected in parallel for each stage.

Figure 5A:
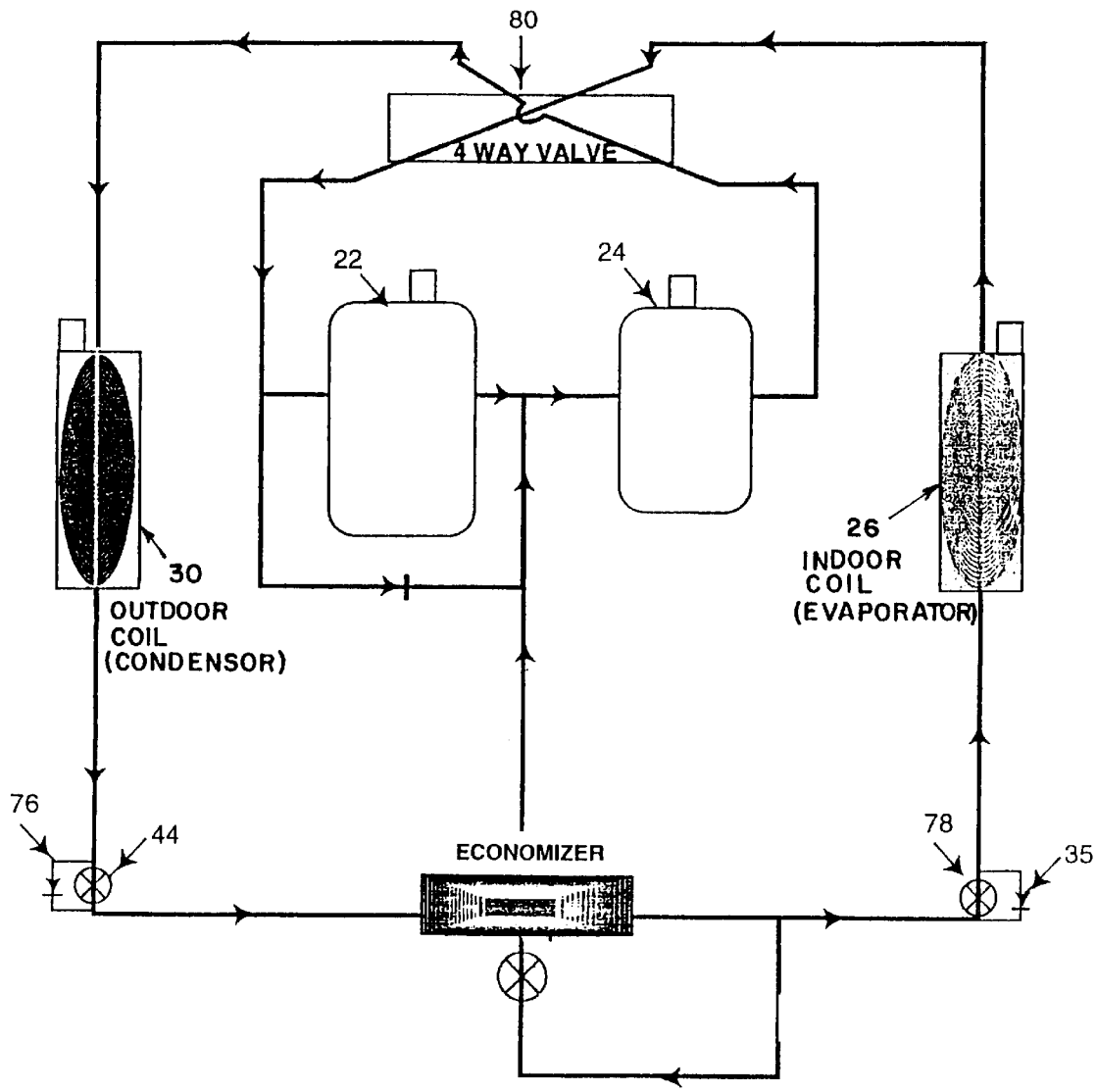
FIG. 5A shows the system of FIG. 5 configured for operation as an air conditioning system.

As is well known in the art, a heat pump may also be operated a an air conditioner. This is illustrated in FIG. 5A. In the system of FIG. 5A, the flow of refrigerant is reversed (as indicated by the arrows), and the refrigerant flows through expansion valve 78 and check valve 76. In the air conditioning mode, 4 way valve 80 is positioned to effect flow as shown in FIG. 5A to reverse the direction of refrigerant flow relative to that in the heat pump system of FIG. 5, except that the flow of refrigerant to or around booster compressor 22 and the primary compressor 24 remains the same in both modes. In the air conditioning mode, indoor coil 26 functions as an evaporator and outdoor coil 30 functions as a condenser. For ease of illustration, the air conditioning system of FIGS. 5A and 5B is shown without the control system.

Figure 8:
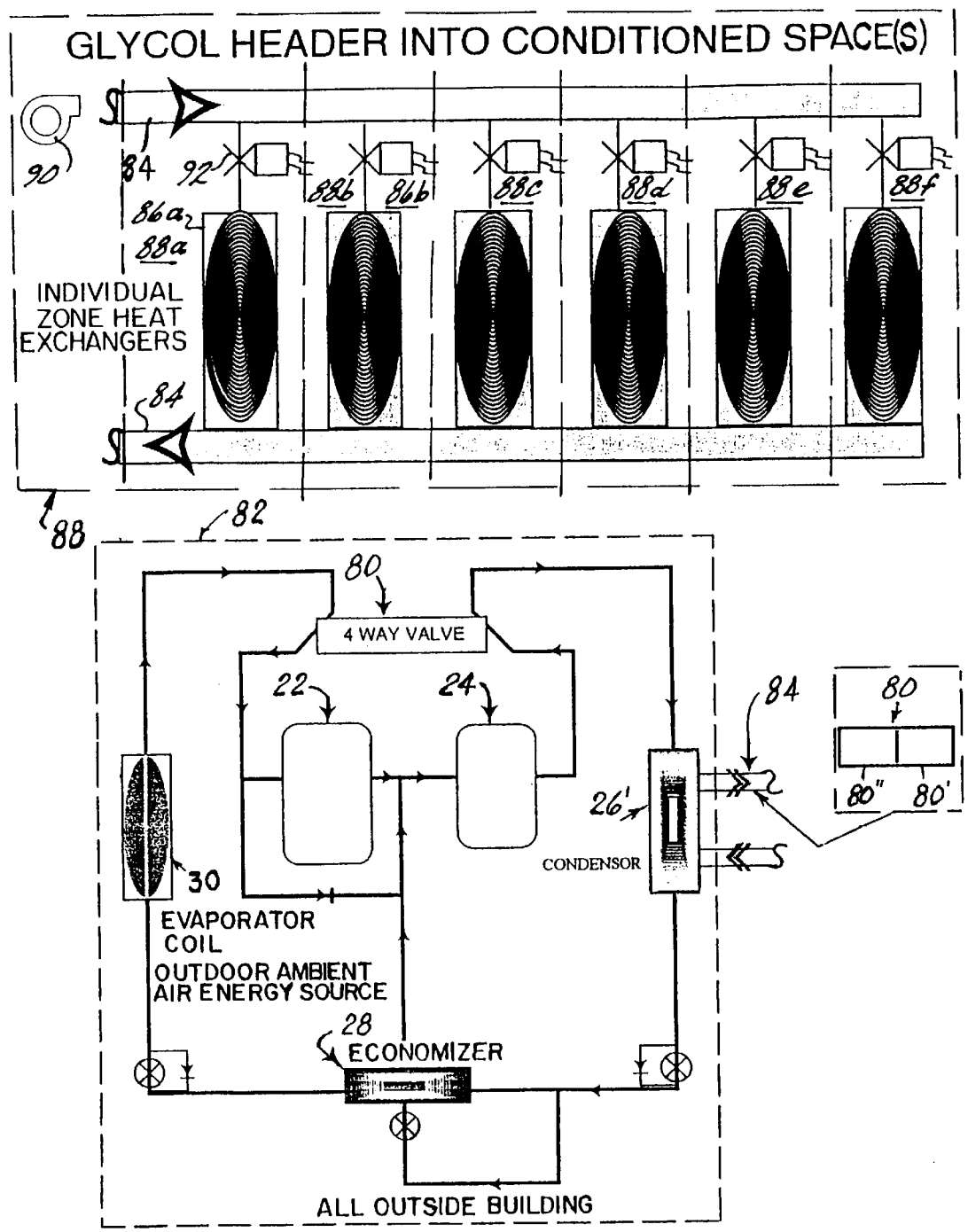
FIG. 8 is a schematic of an alternative boosted heat pump system in accordance with the present invention.

Referring now to FIG. 8, a self contained embodiment of the heat pump of the present invention is shown. By "self contained" it is meant that the entire heat exchange system can be contained in a single enclosure 82, which could be located outside the building to be heated. Alternatively, this self contained system can be located inside the building to be heated, with a protected flow of air (i.e., protected from snow, rain, sleet, etc.) delivered to the system for conditioning. Except as set forth below, all components and functions of the embodiment of FIG. 8 are the same as in the embodiment of FIG. 5.

The self contained embodiment of FIG. 8, has a heat exchanger 26', preferably a brazed plate heat exchanger, instead of indoor coil 26, and a closed fluid loop 84 flows through this heat exchanger and then flows to and through one or more exchanger(s) 86 in the space(s) 88 to be heated. The fluid is circulated in closed loop 84 by a pump 90, and the fluid circulating in closed loop 84 is preferably nontoxic propylene glycol. The control system for the embodiment of FIG. 8 is the same as that for the embodiment of FIG. 5, except that (1) temperature transducer 58 is eliminated, and a thermostat 80, which includes a primary thermostat 80' and a secondary thermostat 80", is connected to sense the temperature of the fluid in the loop 84 at a point just downstream of condenser 26'. Microprocessor 54 will respond to inputs from primary thermostat 80', secondary thermostat 80", temperature sensor 56 and pressure sensor 60 to operate primary compressor 24 and booster compressor 22 in the same way that the control system of FIG. 5 responds to the inputs from primary thermostat 62', secondary thermostat 62", temperature sensor 56 and pressure sensor 60. The space to be heated, e.g., a house, may be divided into parts 88a–88f, such as individual rooms, with each part having its separately controlled heat exchanger 86a–86f connected in parallel. Flow of the fluid through individual heat exchangers 86a–86f is controlled, e.g., by a solenoid operated valve 92 in each parallel flow path, with each solenoid valve being operated by a thermostat control in each separate room. Other branch control devices, such as variable speed fans, could also be used to control the heat delivered to each room. This leads to both comfort and economy in that each space or room can be individually conditioned and controlled as per changing needs or desires, and individual spaces can be entirely shut off from conditioning. In other words, this embodiment leads to zone control for as many separate zones as may be desired.

In all systems, the thermostat (e.g., 62 or 80) may include a selector switch to select heating or cooling operation for the system or to turn the system off. Selection of the heating mode will position four way valve 80 to flow the refrigerant as shown and discussed for the embodiments of FIGS. 5 and 8; selection of the cooling mode will position four way valve 80 to reverse the direction of refrigerant flow through coils 26 and 30.

Referring now to FIGS. 9–12, a second embodiment of the present invention is shown. Parts of the system of the embodiment of FIGS. 9–12 which are the same as the embodiment of FIG. 5 are numbered as in FIG. 5.

Figure 9:
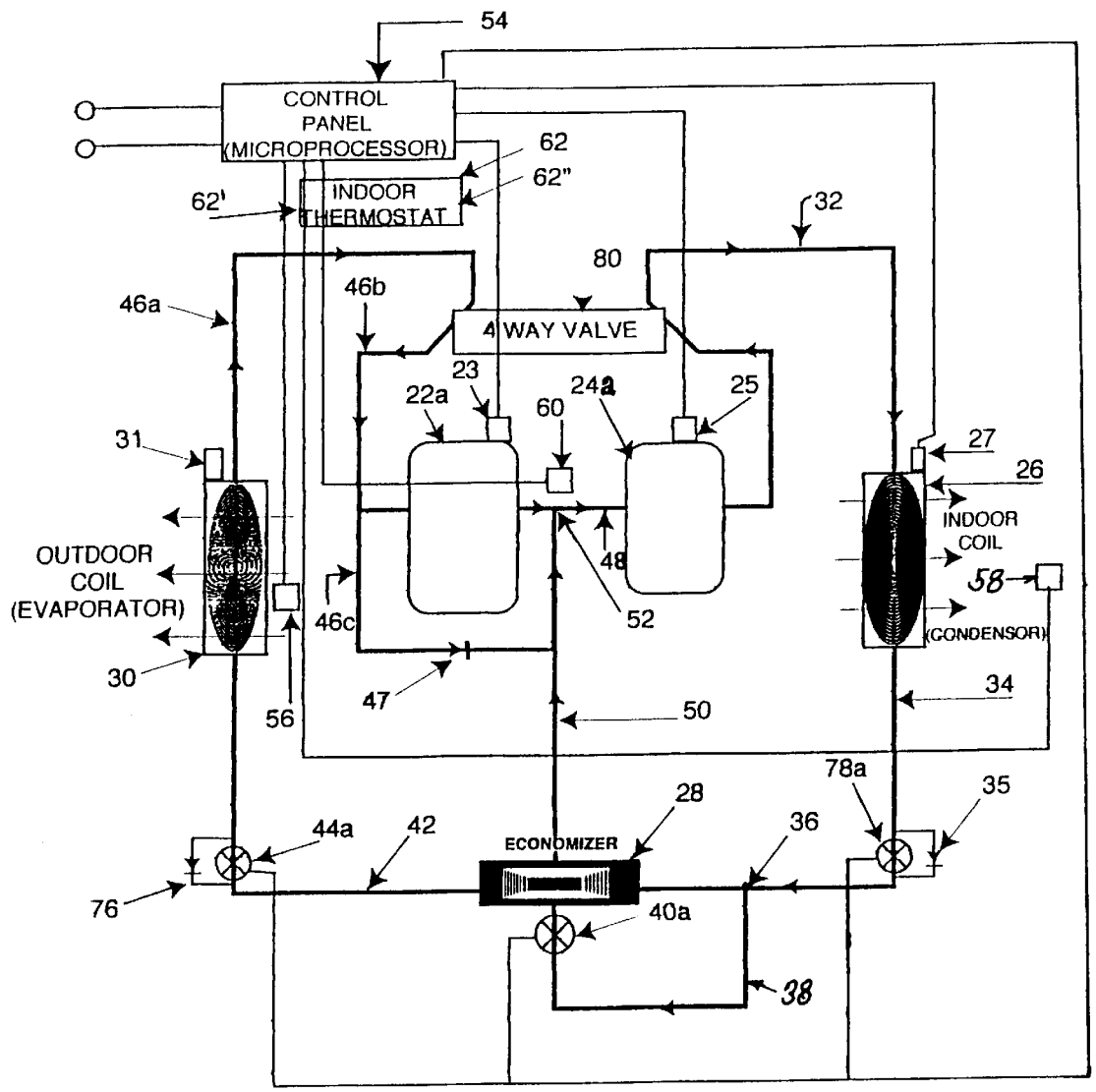
FIG. 9 is a view similar to FIG. 5 showing a schematic diagram of a closed loop boosted air source heat pump system in accordance with the second embodiment of this invention.

Referring to FIG. 9, in the second embodiment of this invention primary compressor 25 is a single speed compressor, and booster compressor 22a is either a single speed compressor or a two speed compressor. Valve 40a is an electrically controlled expansion valve (EEV) through which the flow is controlled (either full "off" or full "on" or modulated therebetween) by signals from microprocessor 54. Valves 44a and 78a are also EEVs, the flow through which may also be modulated by signals from microprocessor 54. Valve 44a would be modulated on the heating cycle, while valve 78a would be modulated during the cooling cycle. Except as set forth in this paragraph, the physical components of the second embodiment of this invention are the same as the physical components of the first embodiment of FIG. 5.

Figure 12:
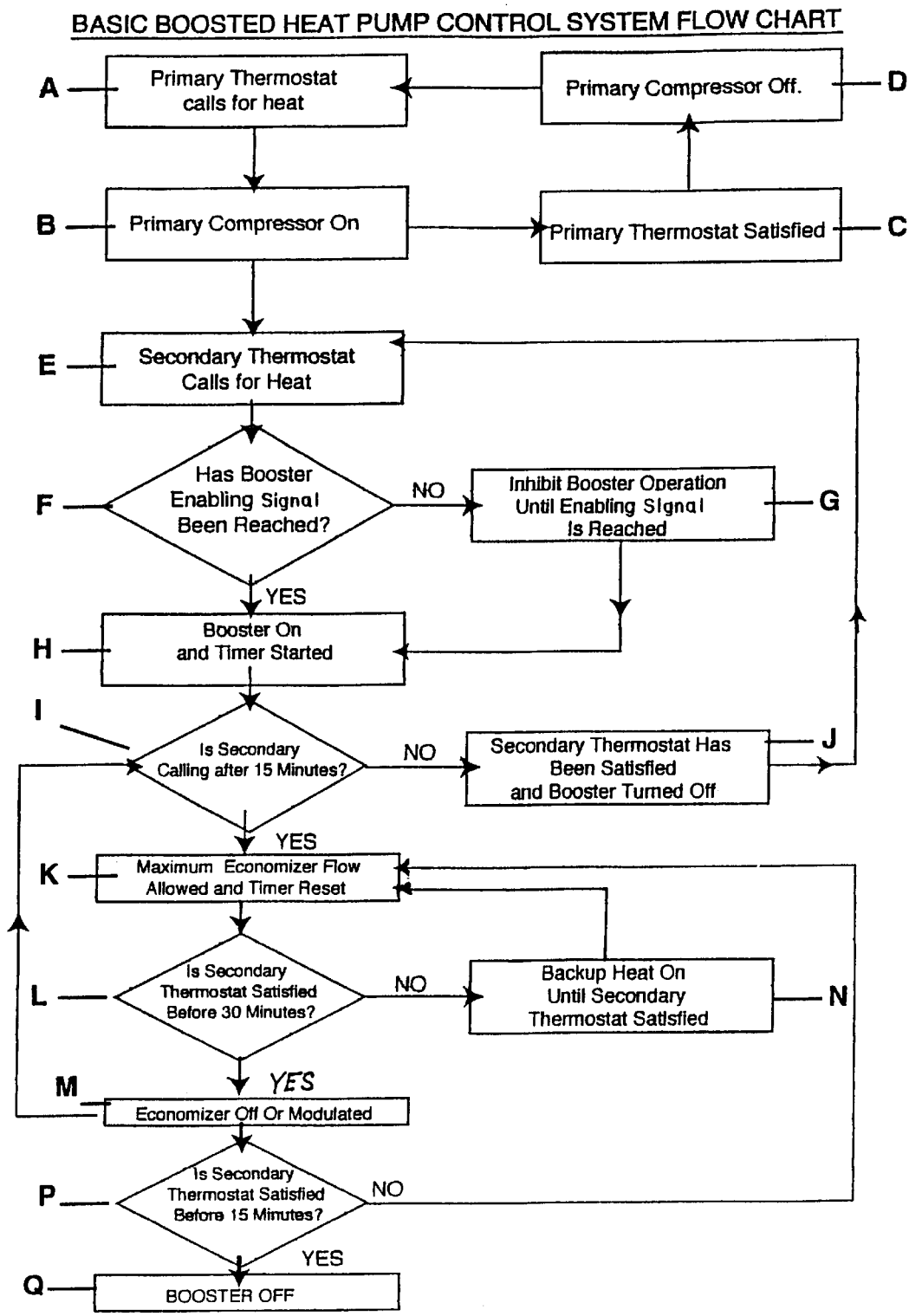
FIG. 12 is a flow chart, similar to FIG. 6, of a control system for the second embodiment of FIG. 9.

Referring to FIG. 12, the control system for the second embodiment is shown. System capacity is monitored and controlled in block K (rather than booster speed as in FIG. 6), and in block M, booster speed goes to minimum and/or the economizer is operated "off"/"on" or modulated to the same level therebetween.

In the operation of the embodiment of FIGS. 9–12, in the heating mode, primary compressor 24 initially operates alone to meet system demand, and operation of booster 22a is prohibited until a booster enabling signal (either pressure or temperature) is reached (as described with respect to the embodiment of FIG. 5). Operation of economizer 28 is inhibited by EEV 40a being in its full off position. Booster compressor 22a is operated when called for by secondary thermostat 62" and when booster enabling pressure or temperature is reached. Assuming a single speed booster compressor, operation of the booster compressor 22a will result in a step increase in system heating capacity. If the secondary thermostat is satisfied, the operation of booster compressor 22a is terminated. If the secondary thermostat is not satisfied within a predetermined period of time (e.g., 15 minutes), then a signal from microprocessor 54 to EEV 40a opens EEV 40a to permit bleed flow through line 38 to operate the economizer, and the bleed fluid flows from economizer 28 via line 50 to interstage point 52. As previously described with respect to the embodiment of FIG. 5, the operation of the economizer increases the heating capacity of the system.

Figure 10:
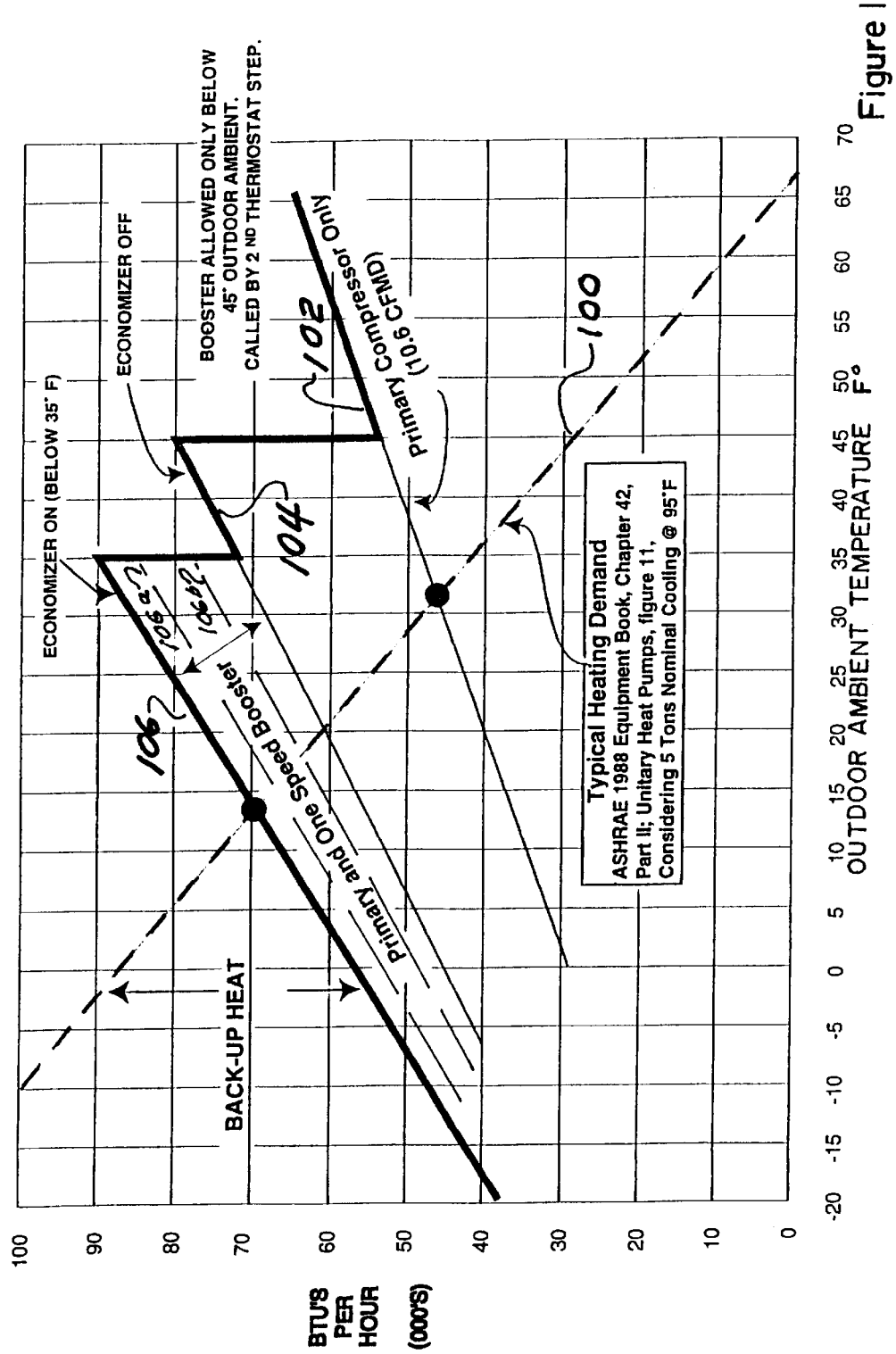
FIGS. 10 and 11 are plots illustrating aspects of operation of the second embodiment of FIG. 9.

FIG. 10 shows a plot illustrating operation of the second embodiment of this invention with a single speed booster and an "on/off" EEV valve 40a for operating the economizer 28. Line 100 is the design balance line of heat (BTU/hr) required to maintain a selected temperature, e.g., 70° F., in the space to be heated. Except as otherwise stated, in this second embodiment, the control system of FIG. 12 operates the same as the control system of FIG. 6.

Referring jointly to FIGS. 10 and 12, if the temperature of the space to be heated falls below the setting of primary thermostat 62', a signal goes from the primary thermostat to microprocessor 54 (block A of FIG. 12), and microprocessor 54 delivers a signal to turn on motor 25 to operate primary compressor 24 (block B of FIG. 12).

Primary compressor 24 then operates along line 102 of FIG. 10 to deliver heat to the space to be heated (for outdoor ambient temperatures ranging, e.g., from 65° F. to 45° F. as shown in FIG. 10). At this time, only primary compressor 24 is operational, and the control system operates according to blocks A, B, C and D of FIG. 12 to cycle the primary compressor off and on as required to satisfy primary thermostat 62'. Also, at this time EEV 40a is fully closed so that no bleed line fluid is delivered for expansion and subcooling in economizer 28. That is, economizer 28 is not functioning, and all fluid in line 34 flows through economizer 28 to line 42 and to evaporator 30 without subcooling in economizer 28. EEV 44a is open as necessary to expand or initiate flashing of the fluid delivered to the evaporator and EEV 78a is bypassed by check valve 35.

If the primary compressor operating alone is unable to meet the heating requirements (usually because of a falling outdoor temperature), the indoor temperature will drop and secondary thermostat 62" will signal microprocessor 54 to call for operation of booster compressor 22a. As described with the first embodiment (FIGS. 5 and 6), controller 54 will check pressure as sensed by pressure transducer 60 to make sure the booster enabling pressure is reached (commensurate with a sufficiently low outdoor ambient temperature) before permitting operation of booster compressor 22a. See blocks E, F, G, H of FIG. 12. Also, in this second embodiment, controller 54 may respond to outdoor ambient temperature as sensed by sensor 56 to inhibit operation of booster compressor 22a until outdoor ambient temperature drops to a predetermined value, which is chosen at 45° F. in the illustration.

FIG. 10 illustrates a situation where operation of booster 22a is initiated at an outdoor ambient temperature of 45° F. The booster compressor and the primary compressor then operate together to supply heat along line 104 of FIG. 10. The control system of FIG. 12 then operates through blocks H, I and J, and back through blocks E, F, G, H, as long as the combined operation of the booster compressor and the primary compressor meets the heating requirements.

If outdoor ambient temperature continues to fall, a point will be reached where the combined operation of the primary and booster compressors is insufficient to meet the heating requirement. In that event, secondary thermostat 62" will not be satisfied (see block I of FIG. 12), and the capacity of economizer 28 will be added to the system. However, in this second embodiment controller 54 responds to outdoor ambient temperature as sensed by sensor 56 to inhibit operation of economizer 28 until outdoor ambient temperature drops to a predetermined economizer enabling value, which is chosen at 35° F. in the illustration. FIG. 10 illustrates a situation where secondary thermostat 62" is not satisfied at an outdoor ambient temperature of 35° F. At that point, controller 54 sends a signal to fully open EEV 40a to bring operation of economizer 28 on line. This is represented by block K of FIG. 12 where system capacity is allowed to go to maximum. This results in operation of the system along line 106 of FIG. 10. If the secondary thermostat is then satisfied within a set time (e.g., 30 minutes), the system will then shut EEV valve 40a to discontinue operation of the economizer (see blocks L and M of FIG. 12). If, after turning off the economizer, secondary thermostat 62" is not satisfied after a set time, e.g., 15 minutes, the control system will return via block P to block K to bring the economizer back on line. If, however, the secondary thermostat is satisfied at block P, the control system will turn off booster compressor 22a (see block Q of FIG. 12). Backup heat will be called for only if the combined operation of the primary compressor, the booster compressor and the economizer are unable to meet system demand (see blocks L and N of FIG. 12).

The foregoing description of the second embodiment is based on an economizer 28/EEV 40a which is two position, i.e., fully off or fully on. Alternatively, EEV 40a could be modulated to various positions between full closed and fill open, and that would result in a range of partial to full operation of economizer 28. This would result in a series of operating lines 106a, 106b, etc. between lines 104 and 106 of FIG. 10. In addition, after EEV 40a has been fully closed to terminate operation of economizer 28, EEV valve 40a could be modulated to one or more less than fully open positions to reduce fluid flow to evaporator 30 to provide a further degree of control to the system before discontinuing operation of booster compressor 22a.

Another alternative could be to add the booster compressor and the economizer to the system at the same time, thus going from line 102 to 106 (FIG. 10) at one time.

When 4-way valve 80 is operated to reverse refrigerant flow for the cooling cycle, valve 78a can be modulated to one or more positions less than full open so as to provide improved humidity control on humid days even when outdoor ambient temperature is not very high.

Figure 11:
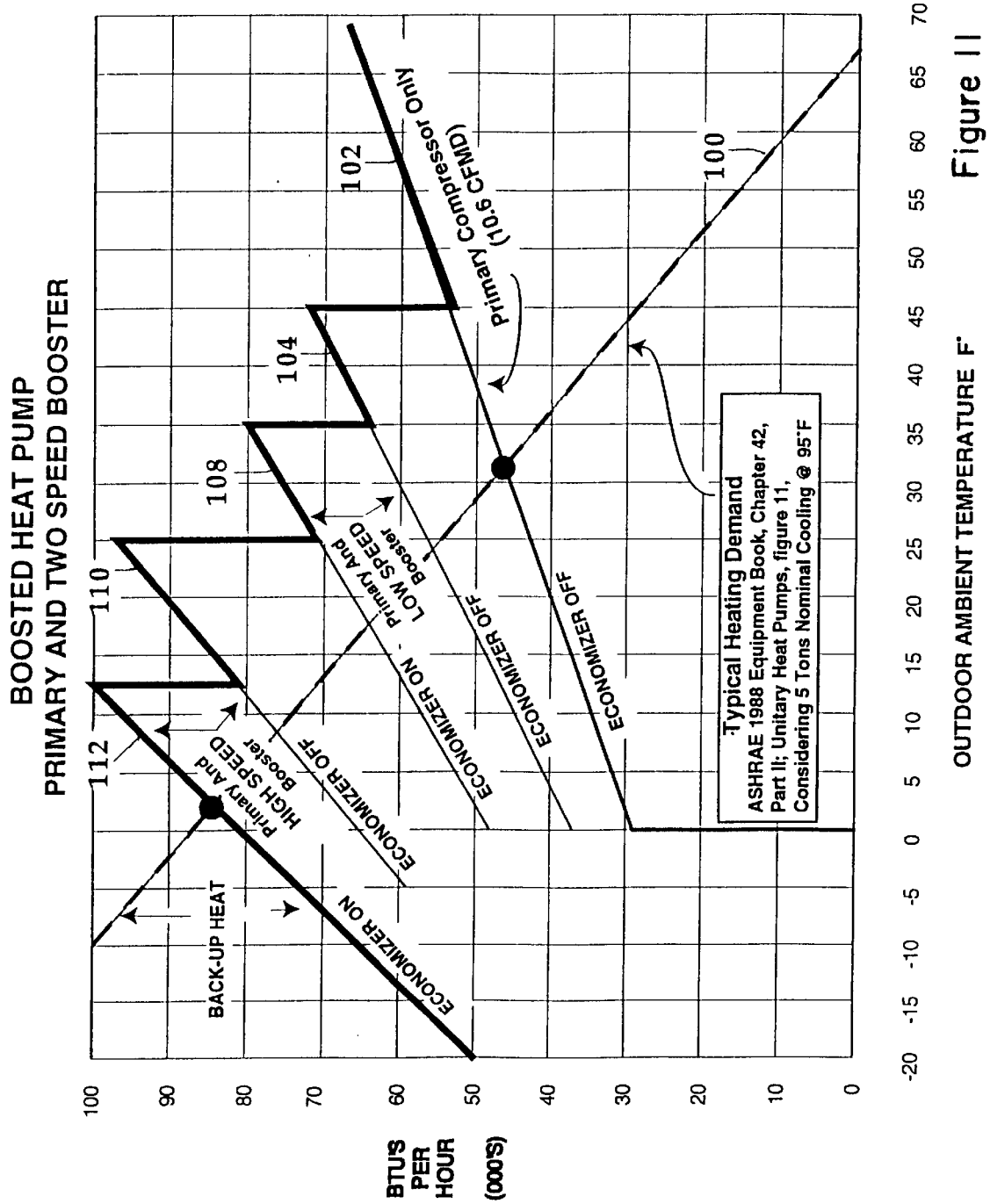

As a modification of the second embodiment of this invention, booster compressor 22a can be a two speed compressor. FIG. 11 shows an operating cycle for this modification. Line 102 represents operation of the system with one speed primary compressor alone. If the outdoor ambient temperature drops to 45° F., the booster is enabled and operated at its low speed. Line 104 represents operation of the system with the one speed primary compressor and the booster compressor at low speed. At an outdoor ambient temperature of 35° F., EEV 40a, which has been fully closed up to this point, is filly opened to bring economizer 28 fully on line. The system then operates to deliver heat along line 108 with operation of the primary compressor, the booster compressor at low speed and the economizer operating. As heating requirements increase and at an outdoor ambient temperature of 25° F., booster compressor 22a is operated at its high speed level and EEV 40a is closed to terminate operation of the economizer 28. The system then operates the deliver heat along line 110 with operation of the primary compressor and the booster at high speed. As heating requirements further increase and at outdoor ambient temperature of about 12.5° F., EEV valve 40a is again opened to bring economizer 28 fully on line. The system then operates to deliver heat along line 1 12 with operation of the primary compressor, the booster compressor at high speed and the economizer. The flow chart of FIG. 12 would be appropriately modified to operate the system as per FIG. 11.

As previously discussed, EEV 40a and economizer 28 and EEV valve 44a can be modulated at intermediate positions between full open and full closed to provide finer degrees of control of system heating capacity.

The second embodiment of this invention, as represented and discussed with respect to FIGS. 9–12, may have an initial lower cost than the first embodiment because the second embodiment does not incur the cost of a variable speed booster compressor motor. As discussed above, except for the single speed or two speed booster the second embodiment relies wholly or primarily on step or modulated operation of the system economizer to provide desired increments of system capacity control.

Significant amounts of energy remain in the warm liquid exiting the heating condenser. If this energy is not recovered from the warm liquid, then system heating capacity is significantly reduced. Thus, the second embodiment of this invention provides for step or modulated increases in heating capacity by control of the system economizer.

In a "basic", i.e., prior art, heat pump system, delivered system capacity falls rapidly as the outdoor ambient temperature falls and the need for increased heating capacity rises. The second embodiment of this invention overcomes this problem by increasing heating system capacity as required. When operation of the fixed speed primary compressor is no longer able to meet heating requirements due to falling ambient temperature, a properly sized booster compressor is brought on line. Subsequently, as heating requirements increase further, the need for additional heating capacity is met by bringing on line the system economizer, either all at once or incrementally. The economizer is always physically in the system, but it is used only when necessary to add the incremental heating capacity afforded by the economizer operation.

The addition of an operating economizer to the system results in a significant increase in system heating capacity. This occurs because the economizer, when operating, pulls a significant amount of energy out of the warm liquid leaving the heating condenser. The vapor generated in the economizer is delivered to and mixes with the booster compressor discharge flow for delivery to the primary compressor. This results in an increased primary compressor mass flow output, thus effecting an increase in system heating capacity. Also, the main fluid flowing through the economizer is significantly cooled, and this much colder liquid is delivered to the evaporator expansion device whereby it picks up a significantly greater amount of energy from the outside air to support the thermodynamic balance of the system. Accordingly, the system economizer can be cycled on and off or otherwise modulated to effect significant changes in system heating capacity.

Referring now to FIGS. 13–18, a third embodiment of this invention is shown. In this third embodiment the primary compressor is on the low side of the system and the booster compressor is on the high side of the system. That is, the primary compressor is upstream of the booster and the booster compressor is downstream of the primary compressor.

The previous embodiments of this invention have discussed a system in which the primary compressor is a fixed speed compressor. Since the primary compressor alone handles most, if not all, of the cooling cycle, variable speed cooling is not realized with these previous embodiments unless a variable speed primary is used. That could significantly increase the cost of the previous embodiments relative to the prior art, especially as regards the first embodiment which also discloses the use of a variable speed booster compressor. Thus, the previous embodiments achieve greatly improved heating performance relative to the prior art but cooling performance was essentially the same as in the prior art (except that better humidity control may be realized in the cooling cycle). The third embodiment of this invention achieves both variable speed cooling and variable speed boosted heating with one variable speed compressor and preferably one fixed speed compressor.

In this third embodiment the primary compressor is the low side or first stage compressor. The booster compressor is the high stage or second stage compressor, and it is a single speed or two speed compressor. With this arrangement, the primary compressor operates at variable speeds for both heating and cooling. The booster compressor, if one speed, will operate only on the heating cycle; and booster compressor operation on the heating cycle is prevented unless the outdoor ambient temperature drops sufficiently low to warrant operation of the booster.

Since the primary compressor is handling the entire cooling cycle, the variable speed drive for the primary compressor must be capable of handling the maximum load cooling cycle requirement; and the maximum torque requirement also rises since the maximum load cooling requirement is handled by the primary compressor at a relatively low RPM. Both factors will increase the size and cost of the variable speed drive motor for the primary compressor. If a two speed booster is employed, it can operate at low speed for cooling and at either speed for heating. This will reduce the size requirement for the primary compressor motor and drive; but it incurs the cost of a two speed motor/drive for the booster compressor.

Since the booster compressor is now on the high pressure side of the refrigerant system, it now becomes necessary to isolate the booster compressor from primary compressor discharge pressure when the booster is not operating. This is necessary because it is unacceptable to have the booster compressor exposed to refrigerant system high side pressure continuously when the booster is not operating. If the booster were continuously exposed to primary compressor high side pressure, significant refrigerant charge could dissolve in the lubricant sump of the booster compressor since refrigerants and lubricants are usually very miscible in their liquid states.

For most residential applications, the booster compressor will likely be equipped with a single phase induction type motor, which is not known for high starting torque capability. Because of that, and also because the primary compressor will be operating whenever booster operation is initiated, it is also necessary to ensure that the high side booster can be started in an unloaded state.

Figure 13:
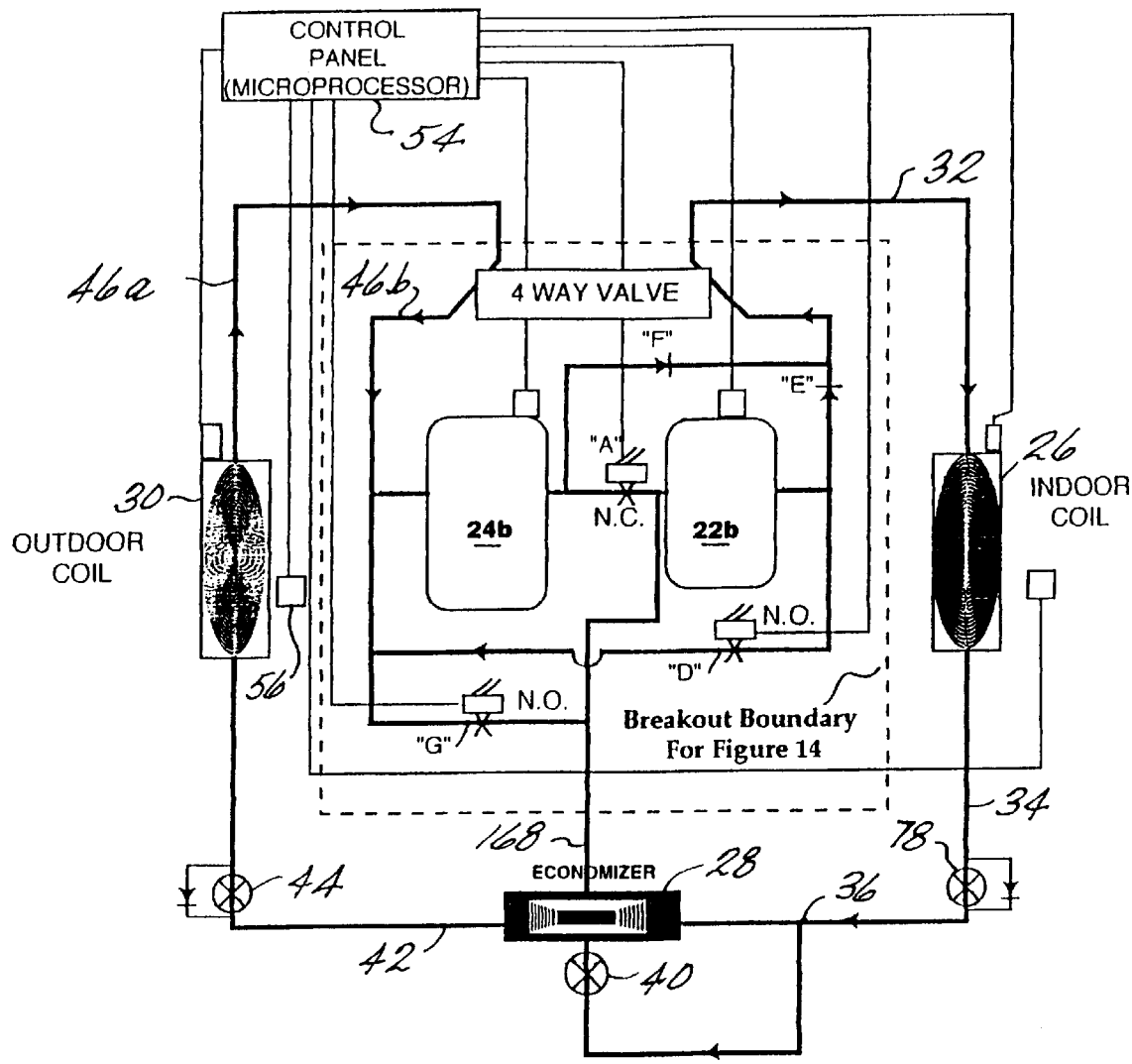
FIG. 13 is a view similar to FIGS. 5 and 9 showing a schematic diagram of a closed loop boosted air source heat pump system in accordance with a third embodiment of this invention.

Referring now to FIG. 13, a schematic is shown of the third embodiment of this invention. This embodiment differs from the first two embodiments in that primary compressor 24b is on the low side of the system, i.e., upstream of booster compressor 22b, and booster compressor 22b is on the high side of the system, i.e., downstream of primary compressor 24b. Primary compressor 24b is a variable speed compressor, and booster compressor 22b is either a fixed or two speed compressor. The embodiment of FIG. 13 also differs from the previous embodiments in that: pressure transducer 60 is omitted, and the booster enabling signal is obtained directly from outdoor ambient temperature sensor 56; check valves E and F are incorporated in the system (although check valve F could be equated to check valve 47 of FIGS. 5 and 9), check valve F being in a bypass line around booster compressor 22b and check valve E being in a discharge line downstream of booster compressor 22b; normally closed solenoid valve A is in the line between the discharge from primary compressor 24b and positioned as shown; normally open solenoid valve D is in a return line from the discharge of booster compressor 22b to the inlet of primary; and normally open solenoid valve G is in a bypass line from the discharge line from the economizer to the inlet of primary compressor 24b. Except as set forth above or below, the apparatus of the FIG. 13 embodiment is the same as and functions like the apparatus of FIG. 5.

In the operation of FIG. 13 in the heating mode, and assuming that primary thermostat 62' is calling for heat, fluid from evaporator 30 will flow to primary compressor 24b and the compressed discharge from primary compressor 24b will be bypassed around booster compressor 22b via check valve F to flow to condenser 26. At this time, normally closed valve A prevents flow from the discharge of primary compressor 24b to the inlet to booster compressor 22b. The main fluid from condenser 26 is delivered through economizer back to evaporator 30. Part of the fluid from condenser 26 is bled through expansion valve 40 to subcool the main fluid flow through the economizer. The expanded or flashed bleed fluid from economizer 28 flows through normally open solenoid valve G to the inlet to primary compressor 24b. Any bleed fluid that does not flow through valve G will be delivered to the inlet to booster compressor 22b, which is inoperative at this time, and will pass through compressor 22b and flow via normally open solenoid valve D to the inlet to primary compressor 24b.

It is to be noted that with primary compressor 24b on and booster compressor 22b off it is technically unacceptable to have booster compressor 22b constantly exposed to refrigerant system discharge pressure from primary compressor 24b. Accordingly, if booster compressor 22b is not operating it must be isolated from the discharge from primary compressor 24b. Also, booster compressor 22b should be able to be started unloaded. These objectives are achieved by the combined operation of normally closed solenoid valve A, normally open solenoid valves D and G, and check valves E and F.

Figure 17:
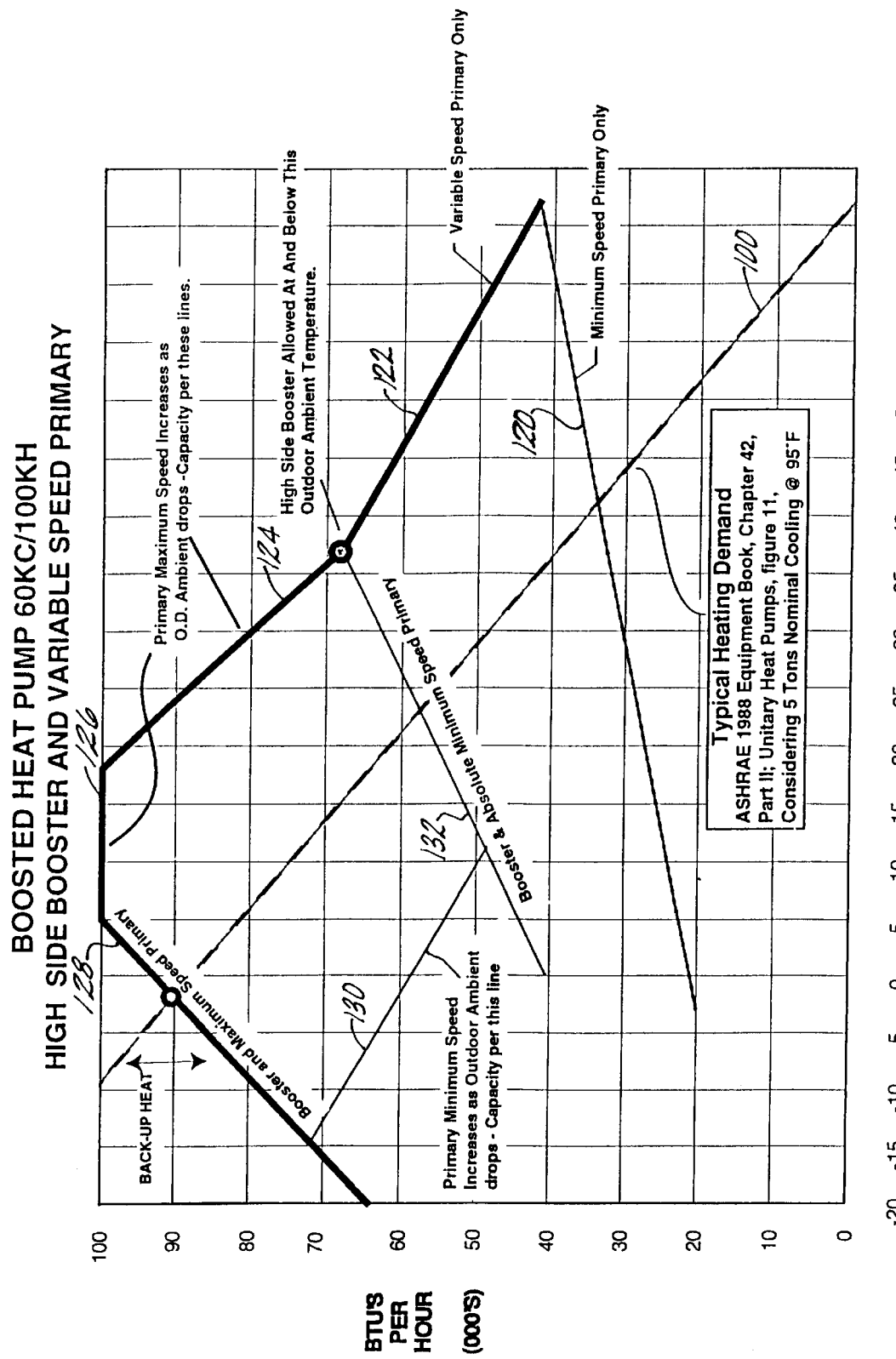
FIG. 17 is a plot illustrating aspects of operation of the third embodiment of this invention.

During the initial phase of operation, i.e., when the primary thermostat 62' first calls for heat, controller 54 varies the speed of primary compressor from minimum speed line 120 along variable speed line 122 of FIG. 17 as outdoor ambient temperature drops to increase system heating capacity. This phase of operation is indicated at blocks A–D of FIG. 18; and it will continue as long as secondary thermostat 62" does not call for more heat capacity from the system.

In this third embodiment, operation of booster compressor 22b is inhibited by controller 54 until controller 54 receives a signal from outdoor ambient temperature sensor 56 indicating that a booster enabling temperature has been reached, which is chosen at 37° F. in the example illustrated in FIG. 17. Alternatively, a booster enabling pressure could be sensed at the entrance to primary compressor 24b. Upon receipt of a signal from secondary thermostat 66" calling for more heat, controller 54 will (1) send a signal to the drive for primary compressor to reduce the speed of primary compressor 24b to its lowest setting and (2) send a signal to the drive for booster compressor 22b to initiate operation of booster compressor 22b. Once booster 22b is started, controller 54 will also deliver signals to open normally closed solenoid valve A and to close normally open solenoid valves D and G. This results in the delivery of the discharge from primary compressor 24b to the inlet of booster compressor 22b. The closing of normally open valve D terminates the return flow from booster discharge to primary inlet, so the discharge from booster compressor 22b now flows to condenser 26. The closing of normally open valve G terminates the flow of economizer bleed fluid to the inlet of primary compressor 24b, and that bleed fluid is now delivered at a compressor interstage point in the line between the discharge from primary compressor 24b and the inlet to booster compressor 22b. Thus, the isolation of booster compressor 22b is ended and booster 22b is started in an unloaded state.

Figure 18:
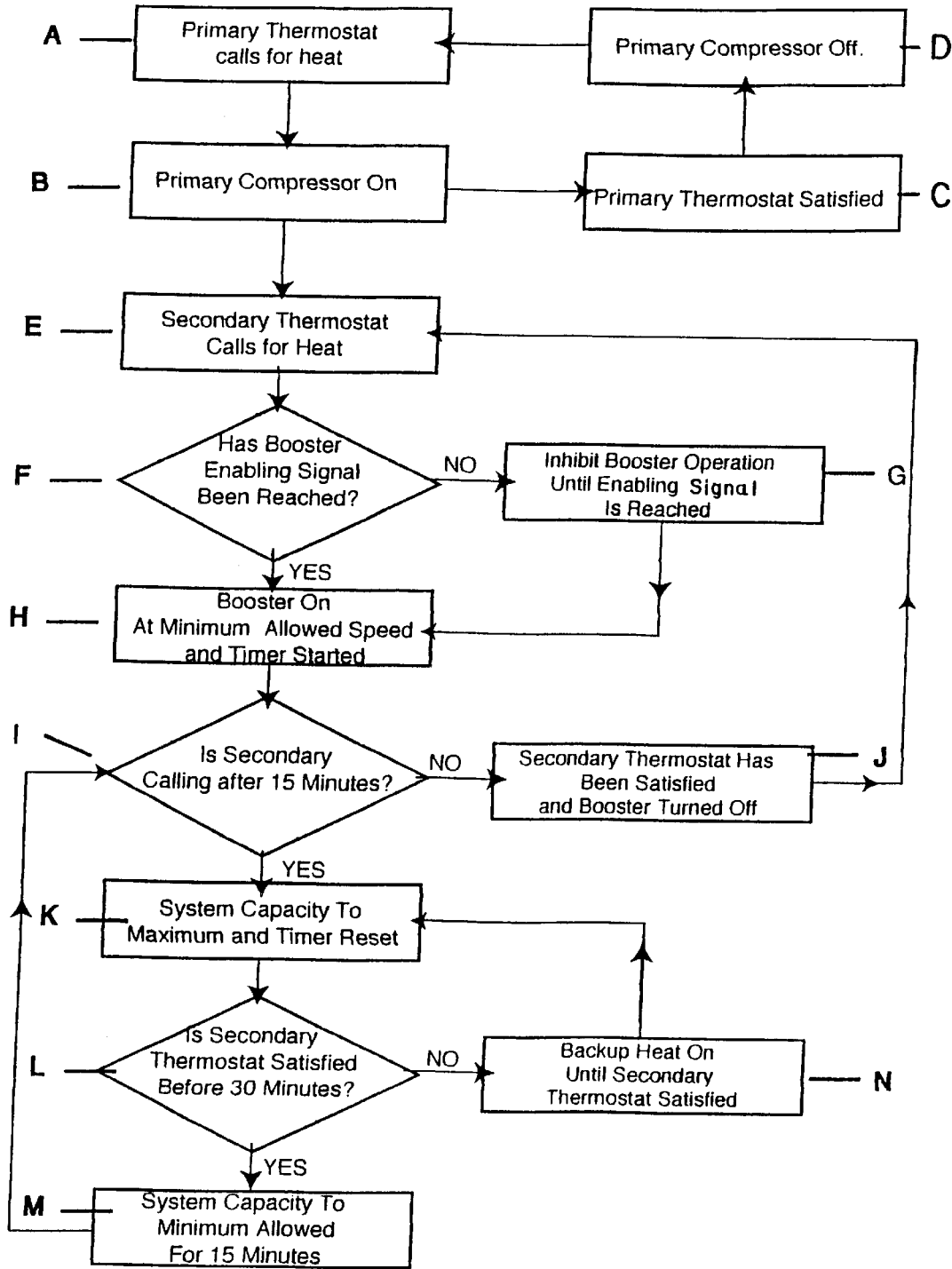
FIG. 18 is a flow chart, similar to FIGS. 6 and 12 of a control system for the third embodiment of this invention.

The initiation of operation of booster compressor 22b is indicated at blocks E, F, G and H of FIG. 18. This, of course, adds the heating capacity of the booster compressor to the system. At this time, the system will operate along line 124 of FIG. 17, with controller 54 increasing the speed of primary compressor 24b to increase system heating capacity as outdoor ambient temperature drops.

If the secondary thermostat is satisfied within 15 minutes (i.e., it is no longer calling for heat) (block I of FIG. 18), booster 22b is turned off, valves A, D and G are returned to their original status (block J of FIG. 18), and the control system then returns to block E.

If the secondary thermostat is still calling for heat after a set period of time, e.g., 15 minutes (block I of FIG. 18), controller 56 will increase the speed of primary compressor 24b to the maximum allowable speed (maximum system capacity, block K of FIG. 18), and the system will operate along liens 124 and 126 and 128 of FIG. 17 for a set period of time, e.g., 30 minutes (block L of FIG. 18). If the secondary thermostat is not satisfied after the set period of time, the backup heat will be turned on (block N of FIG. 18) and the control system will recycle to block K when the secondary thermostat has been satisfied. If, however, the secondary thermostat has been satisfied (block L of FIG. 18), system capacity will be reduced for 15 minutes (block M of FIG. 18) by reducing the speed of primary compressor 24b either along line 130 to line 132 of FIG. 17 or by going from any point on lines 124, 126, or 128 to line 132, and the control system will recycle to block I.

Figure 14:
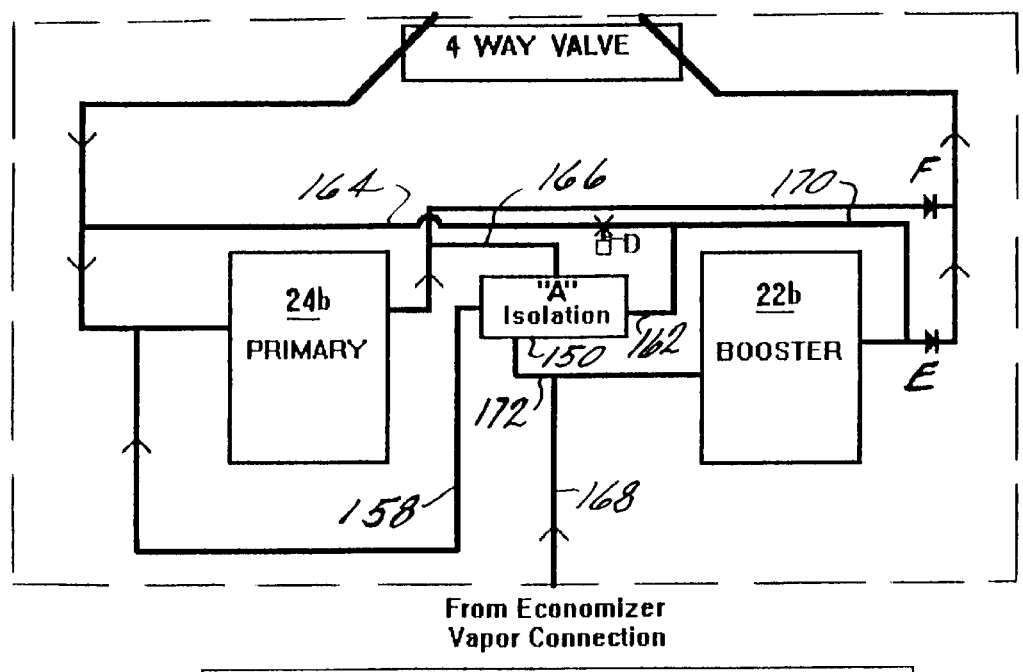
FIG. 14 is a partial view of FIG. 13 showing an alternative valving and isolation system for the third embodiment of FIG. 13.

Referring now to FIG. 14, there is shown a modified portion of FIG. 13 enclosed within the dashed line of FIG. 13. The modification involves the use of an isolation valve A instead of the solenoid valves A and G of FIG. 13. The details of isolation valve A are also shown in FIG. 15a, where booster 22b is off and in FIG. 15b where booster 22b is on.

Referring jointly to FIGS. 14, 15a and 15b, isolation valve A is indicated generally at 150. Valve 150 has a spool piston 152 which is loaded to the right to a first (booster off) position by a spring 154 (see FIG. 15b). When the booster compressor 22b is off, chamber 156 on the left side of valve 150 is connected by line 158 to system low side pressure, i.e., to pressure at or upstream of the inlet to primary compressor 24b. The space 160 at the right end of valve 150 is also connected to system low side pressure by line 162, normally open solenoid valve D and line 164. Therefore, the pressure is equal on both sides of spool piston 152, and spring 154 moves the spool to the rightward position shown in FIG. 15b. In this rightward position, primary compressor discharge flow delivered to isolation valve 150 via line 166 is dead ended in isolation valve 150. Also, economizer discharge flow from line 168 (see also FIG. 13) is delivered via chamber 156 and line 158 to the inlet to primary compressor 24b. Accordingly, booster compressor 22b is isolated from the discharge pressure of primary compressor 24b when the booster is not operating.

After operation of booster compressor 22b is initiated, solenoid valve D is closed. This results in chamber 160 on the right side of valve 150 being connected by lines 162 and 170 to the discharge side of booster 22b. This high pressure in chamber 160 loads the right face of spool 152 to move the spool leftward to compress spring 154, whereby the spool is moved to the position shown in FIG. 15a. In the FIG. 15a position, spool 152 connects line 166 to line 172 which, in turn, is connected to the inlet to booster compressor 22b.

Accordingly, it can be seen that in the "booster off" position of FIG. 15b, isolation valve 150 (valve A of FIG. 13) isolates booster compressor from the discharge from the primary compressor, so booster compressor 22b is unloaded when not operating. However, when operation of booster compressor 22b is initiated, valve 150 functions to connect the discharge from primary compressor 24b to the inlet of high side booster compressor 22b. As previously described, normally open solenoid valve D remains open until some time after operation of booster compressor 22b is initiated. Valve D is closed only when booster compressor reaches or approaches operating speed, thus ensuring an unloaded start for the booster compressor.

The isolation valve 150 of FIGS. 14 and 15 may be preferred to the solenoid valves F and G of FIG. 13, since relatively large, and therefore expensive, solenoid valves might be required.

Figure 16:
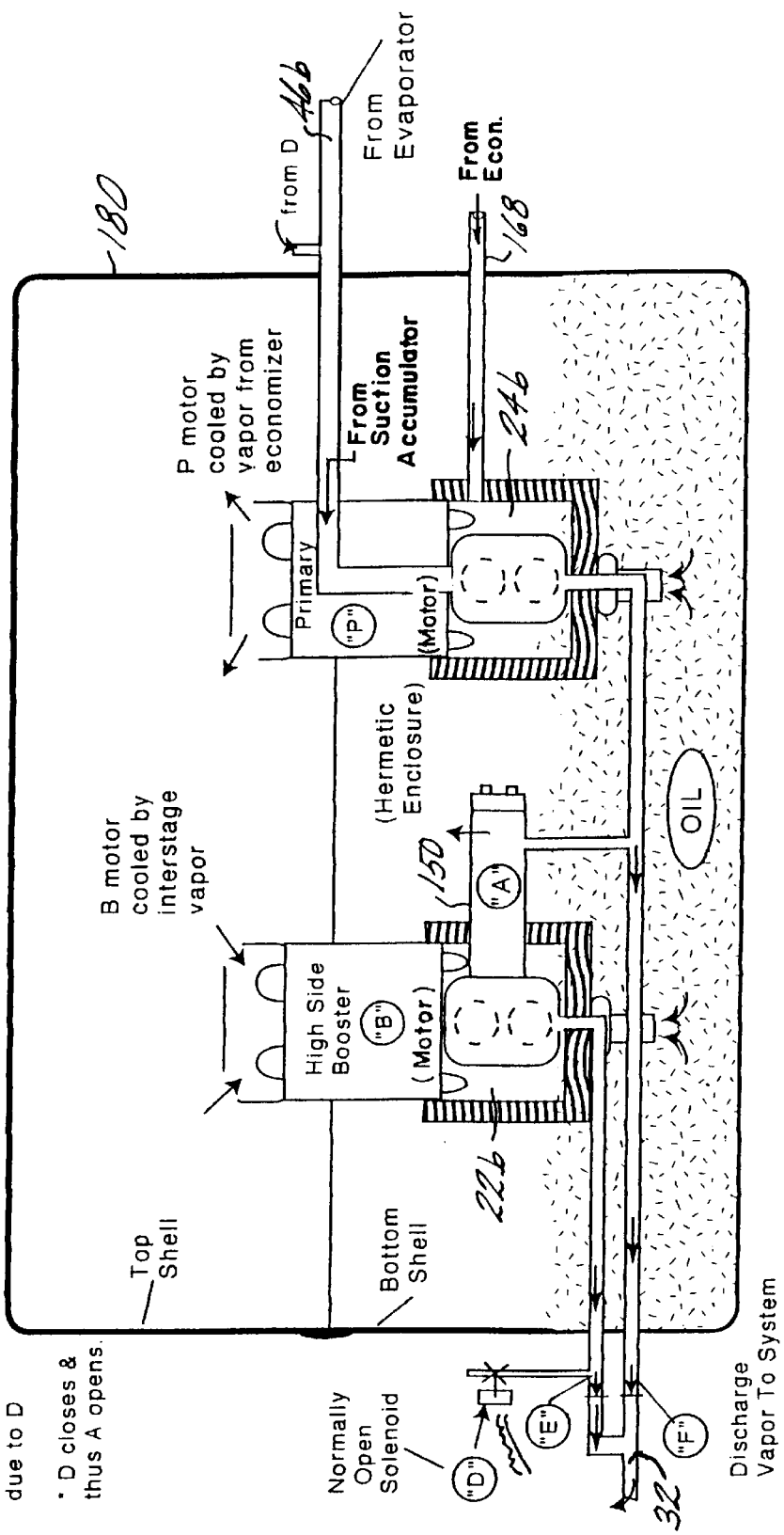
FIG. 16 shows a schematic of a single shell compression module in accordance with the third embodiment of FIG. 13.

Referring now to FIG. 16, an arrangement is shown wherein the variable speed primary/high side booster configuration of the third embodiment is contained within a single shell hermetically sealed compression module. In this configuration, primary compressor 24b and booster compressor 22b are housed within a hermetically sealed casing or shell 180. In this arrangement, the primary and booster compressors share a common oil sump. Also, when booster 22b is not operating, economizer vapor flow from line 168 flows through and around the drive motor of primary compressor 24b to cool the drive motor. After cooling the primary compressor drive motor, this economizer vapor flows into the interior of casing 180 and then flows through booster 22b and then through normally open valve D to join the primary compressor suction flow. The discharge flow from primary compressor 24b flows through check valve F and conduit 32 directly to condenser 26. Valve 150 is in the FIG. 15b position so primary compressor discharge flow is dead ended in the valve and cannot flow into the interior of casing 180.

When operation of booster compressor 22b is started, normally open valve D is closed, thereby preventing the return of discharge fluid from booster 22b to the inlet to primary compressor 24b. In this two stage operation, suction gas from line 46b to primary compressor 24b is directly fed to the primary compressor and is discharged via valve 150 (in the FIG. 15a position) into the interior of casing 180. At the same time economizer flow from line 158 still flows through the motor of primary compressor 24b and into the interior of casing 180 to cool the motor of the primary compressor. The discharge gas from primary compressor 24b and the economizer gas flow which cooled the primary compressor motor mix within casing 180, and the mixed gasses flow through the motor of booster compressor 22b to cool that motor; and these mixed gasses are then inducted, via appropriate valving, into the compressor chamber of booster compressor 22b. The fully compressed discharge flow from booster compressor 22b then flows via check valve E and conduit 32 to condenser 26.

It will be noted that in the two stage mode of operation (i.e., both primary and booster compressors operative), the heat losses of the primary compressor drive motor which are absorbed by the cooling flow of economizer gas are not returned to the inlet to the primary compressor, because valve D is closed. Thus, when it is most important to do so, system low side motor losses are kept away from the primary compressor flow.

With respect to the third embodiment of the invention, it will be noted that economizer 28 is normally fully operational. However, this third embodiment could, if desired, be configured and controlled with off/on or fully modulated operation of the economizer. Also, although booster compressor 22b has been described as a one speed compressor, it could also be a two speed compressor to increase the capacity of the system.

As will be understood by those skilled in the art, the purpose and effect of controlling operation of the compressors by bringing the booster compressor on line, or taking it off line, or varying the speed of either the booster compressor or the primary compressor is to vary the pumping capacity of the compressors in the system, i.e., the amount of vapor drawn from the system evaporator; and this is the preferred approach in the present invention for varying pumping capacity. That is, when operation of the booster compressor is initiated, or the speed of either the booster compressor or the primary compressor is increased, the pumping capacity of the system is increased. Conversely, when operation of the booster is terminated, or the speed of either the primary or booster compressor is reduced, the pumping capacity of the system is reduced.

However, as is also known to and understood by those skilled in the art, there are many other known and equivalent ways which can be employed to vary the pumping capacity of the compressors in the system, and any such known way can be employed as an equivalent in the system of the present invention. For example, with reciprocating compressors, pumping capacity can be varied in response to ambient outdoor air temperature by activating or deactivating cylinders by a variety of means well known in the art, one of which is opening or closing the intake port to a given cylinder, and another of which is initiating or terminating or varying the length of stroke of the piston in the cylinder, as by variable angle swash plates, cams, eccentrics or otherwise. By way of further example, for scroll and screw compressors, or for any positive displacement compressor, the pumping capacity can be varied by bypassing partially, i.e., lightly, compressed gas.

Many specific examples are disclosed in the prior art of ways to vary the pumping capacity of compressors. The textbook *Industrial Compressors* by Peter O'Neill, Butterworth-Heinemann Ltd.© 1993 at pages 278, 279 discloses variable speed, internal capacity control valves, external valves on the compressor suction, and external valves on the compressor discharge. U.S. Pat. Nos. 5,567,124 and 5,573,379 disclose swash plate systems controlling compressor pumping capacity. U.S. Pat. Nos. 4,583,373; 4,667,646 and 4,878,818 disclose movable internal valves for controlling compressor pumping capacity. U.S. Pat. No. 3,184,151 discloses a bypass valve system for controlling compressor pumping capacity. Bristol Compressors (a division of York International) of Bristol, Va. offers a system in which the stroke of a piston is varied or stopped depending on direction of rotation of the crank shaft and positioning of a crankshaft lobe. All of the foregoing, which are equivalent ways to vary the pumping capacity of compressors, are fully incorporated herein by reference.

By way of example, both the primary compressor 24 and the booster compressor 22 can be reciprocating compressors, with the displacement, i.e., the pumping capacity, of one or both compressors being variable by either varying the displacement of the piston in one or more cylinders, or opening or closing an intake valve to the cylinder.

While any refrigerant can be used in implementing the present invention for most presently available positive displacement compressors, the refrigerant AZ-20 available from Allied Signal is preferred because its relatively high density vapor at low ambient temperatures makes it possible to reduce the size of the compressors for a given system capacity.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A heat pump including:

a primary compressor;

a booster compressor;

first and second heat exchange means;

flow conduit means connecting said first and second heat exchange means and said primary compressor for circulating a refrigerant fluid in a closed loop;

economizer means connected in said flow conduit means between said first and second heat exchangers;

bleed means connected from said flow conduit means to said economizer means to deliver a portion of the refrigerant fluid to said economizer means for vaporization in heat exchange with the remaining portion of refrigerant fluid passing through said economizer means;

conduit means connected from said economizer means to said flow conduit means upstream of the intake of said primary compressor;

first sensor means for sensing a parameter commensurate with the temperature of ambient outdoor air;

second sensor means for sensing a parameter of booster compressor operation commensurate with power input to said booster compressor;

thermostat means for sensing the temperature of a fluid to be heated or cooled; and control means responsive to inputs from said first sensor means, said second sensor means and said thermostat means for controlling operation of said primary compressor and said booster compressor, said control means functioning initially to operate said primary compressor in response to a first input signal from said thermostat means while maintaining said booster compressor inoperative, and thereafter functioning to operate said booster compressor and said primary compressor upon receipt of a second signal from said thermostat means and receipt of a booster enabling signal commensurate with the temperature of ambient outdoor air;

said flow conduit means being connected to bypass said booster compressor and deliver fluid from one of said heat exchangers to said primary compressor when said booster compressor is inoperative, and said flow conduit means being connected to deliver fluid from said one heat exchanger to said booster compressor and from said booster compressor to said primary compressor when operation of said booster compressor is initiated.

2. The heat pump of claim 1 wherein:

said parameter of booster compressor operation is chosen from the group comprising:
pressure of the refrigerant fluid between the discharge from said booster compressor and the intake to said primary compressor, the rotational speed of said booster compressor, and the kilowatt input to said booster compressor.

3. The heat pump of claim 1 wherein:

said first heat exchanger means is an evaporator located in said flow conduit means downstream of said economizer means and upstream of said booster compressor and said primary compressor; and said second heat exchange means is a condenser located in said flow conduit downstream of said primary compressor and upstream of said economizer.

4. The heat pump of claim 1 wherein:

said control means is effective to control operation of said booster compressor in accordance with a set point of said parameter of booster compressor operation sensed by said second sensor means; and said control means is responsive to said first sensor means to vary the level of said set point of said parameter of booster compressor operation as a function of outdoor ambient temperature.

5. The heat pump of claim 1 wherein:

said first heat exchanger means is an evaporator serving as an outdoor coil located in said flow conduit means downstream of said economizer means and upstream of said booster compressor, said evaporator receiving a flow of outdoor ambient air; and said second heat exchanger means is a condenser serving as an indoor coil located in said flow conduit downstream of said primary compressor and upstream of said economizer, said condenser receiving a flow of air to be conditioned; and further including third sensor means for sensing the temperature of air from said condenser; and flow control means for controlling the flow of air over said condenser in response to said third sensor means.

6. The heat pump of claim 1 wherein:

one of said first and second heat exchange means is an evaporator; and the other of said first and second heat exchange means is a condenser.

7. The heat pump of claim 6, including:

third sensor means for sensing the temperature of air from said condenser; and flow control means for controlling the flow of air over said condenser in response to said third sensor means.

8. The heat pump of claim 1, including:

valve means moveable from a first position to a second position to control the direction of flow of refrigerant fluid in said closed loop;

said valve means in a first position directing the flow of refrigerant fluid from said primary compressor to one of said heat exchange means functioning as a condenser, and from said condenser to said economizer and then to the other of said heat exchange means functioning as an evaporator; and said valve means in a second position directing the flow of refrigerant fluid from said primary compressor to said other of said heat exchange means functioning as a condenser, and from said condenser to said economizer and then to said one of said heat exchange means functioning as an evaporator.

9. The heat pump of claim 1 wherein:

said primary compressor is a one speed compressor; and said booster compressor is a variable speed or multispeed compressor.

10. The heat pump of claim 1 wherein:

said primary compressor is a one speed compressor; and said booster compressor is a variable speed or multispeed compressor.

11. A heat pump including:

a primary compressor;

a booster compressor;

first and second heat exchange means;

flow conduit means connecting said first and second heat exchange means and said primary compressor for circulating a refrigerant fluid in a closed loop;

economizer means connected in said flow conduit means between said first and second heat exchangers;

bleed means connected from said flow conduit means to said economizer means to deliver a portion of the refrigerant fluid to said economizer means for vaporization in heat exchange with the remaining portion of refrigerant fluid passing through said economizer means;

conduit means connected from said economizer means to said flow conduit means upstream of the intake of said primary compressor;

first sensor means for sensing a parameter commensurate with the temperature of ambient outdoor air;

second sensor means for sensing the pressure of refrigerant fluid at a point in said flow conduit means between said booster compressor and said primary compressor;

thermostat means for sensing the temperature of a fluid to be heated or cooled; and control means responsive to inputs from said first sensor means, said second sensor means and said thermostat means for controlling operation of said primary compressor and said booster compressor, said control means functioning initially to operate said primary compressor in response to a first input signal from said thermostat means while maintaining said booster compressor inoperative, and thereafter functioning to operate said booster compressor and said primary compressor upon receipt of a second signal from said thermostat means and receipt of a booster enabling signal from said second sensor means;

said flow conduit means being connected to bypass said booster compressor and deliver fluid from one of said heat exchangers to said primary compressor when said booster compressor is inoperative, and said flow conduit means being connected to deliver fluid from said one heat exchanger to said booster compressor and from said booster compressor to said primary compressor when operation of said booster compressor is initiated.

12. The heat pump of claim 11 wherein:

said first heat exchanger means is an evaporator located in said flow conduit means downstream of said economizer means and upstream of said booster compressor and said primary compressor; and said second heat exchange means is a condenser located in said flow conduit downstream of said primary compressor and upstream of said economizer.

13. The heat pump of claim 11 wherein:

said control means is effective to control operation of said booster compressor in accordance with a set point of said second sensor means; and said control means is responsive to said first sensor means to vary the level of said set point as a function of outdoor ambient temperature.

14. The heat pump of claim 11 wherein:

said first heat exchanger means is an evaporator serving as an outdoor coil located in said flow conduit means downstream of said economizer means and upstream of said booster compressor, said evaporator receiving a flow of outdoor ambient air; and said second heat exchanger means is a condenser serving as an indoor coil located in said flow conduit downstream of said primary compressor and upstream of said economizer, said condenser receiving a flow of air to be conditioned; and further including third sensor means for sensing the temperature of air from said condenser; and flow control means for controlling the flow of air over said condenser in response to said third sensor means.

15. The heat pump of claim 11 wherein:

one of said first and second heat exchange means is an evaporator; and the other of said first and second heat exchange means is a condenser.

16. The heat pump of claim 15, including:

third sensor means for sensing the temperature of air from said condenser; and flow control means for controlling the flow of air over said condenser in response to said third sensor means.

17. The heat pump of claim 11, including:

valve means moveable from a first position to a second position to control the direction of flow of refrigerant fluid in said closed loop;

said valve means in a first position directing the flow of refrigerant fluid from said primary compressor to one of said heat exchange means functioning as a condenser, and from said condenser to said economizer and then to the other of said heat exchange means functioning as an evaporator; and said valve means in a second position directing the flow of refrigerant fluid from said primary compressor to said other of said heat exchange means functioning as a condenser, and from said condenser to said economizer and then to said one of said heat exchange means functioning as an evaporator.

18. The heat pump of claim 11 wherein:

said primary compressor is a one speed compressor; and said booster compressor is a variable speed or multispeed compressor.

19. A heat pump including:

a primary compressor;

a booster compressor;

first and second heat exchangers;

a conduit loop connecting said first and second heat exchangers, and said primary compressor for circulating a refrigerant therein;

an economizer connected in said conduit loop between said first and second heat exchangers;

a first economizer conduit connecting said economizer and said conduit loop to deliver a portion of the refrigerant from said conduit loop to said economizer for vaporization with the remaining portion of the refrigerant passing through said economizer;

a second economizer conduit connecting said economizer to said conduit loop upstream of the intake of said primary compressor;

a first sensor for sensing a parameter commensurate with the temperature of ambient outdoor air;

a second sensor for sensing a parameter of booster compressor operation commensurate with power input to said booster compressor;

a thermostat for sensing the temperature of a medium to be heated or cooled; and a controller responsive to inputs from said first sensor, said second sensor and said thermostat for controlling operation of said primary compressor and said booster compressor, said controller functioning initially to operate said primary compressor in response to a first input signal from said thermostat while maintaining said booster compressor inoperative, and thereafter functioning to operate said booster compressor and said primary compressor upon receipt of a second signal from said thermostat and receipt of a booster enabling signal commensurate with the temperature of ambient outdoor air;

said conduit loop being connected to bypass said booster compressor and deliver the refrigerant from one of said first and second heat exchangers to said primary compressor when said booster compressor is inoperative, and said conduit loop being connected to deliver the refrigerant from said one heat exchanger to said booster compressor and from said booster compressor to said primary compressor when operation of said booster compressor is initiated.

20. The heat pump of claim 19 wherein:

said parameter of booster compressor operation is chosen from the group comprising:
pressure of the refrigerant between the discharge from said booster compressor and the intake to said primary compressor, the rotational speed of said booster compressor, and the kilowatt input to said booster compressor.

21. The heat pump of claim 19 wherein:

said first heat exchanger is an evaporator located in said conduit loop downstream of said economizer and upstream of said booster compressor and said primary compressor; and said second heat exchanger is a condenser located in said conduit loop downstream of said primary compressor and upstream of said economizer.

22. The heat pump of claim 19 wherein:

said controller is effective to control operation of said booster compressor in accordance with a set point of said parameter of booster compressor operation sensed by said second sensor; and said controller is responsive to said first sensor to vary the level of said set point of said parameter of booster compressor operation as a function of outdoor ambient temperature.

23. The heat pump of claim 19 wherein:

said first heat exchanger is an evaporator serving as an outdoor coil located in said conduit loop downstream of said economizer and upstream of said booster compressor, said evaporator receiving a flow of outdoor ambient air; and said second heat exchanger is a condenser serving as an indoor coil located in said conduit loop downstream of said primary compressor and upstream of said economizer, said evaporator receiving a flow of air to be conditioned; and further including a third sensor for sensing the temperature of air from said condenser; and a flow controller for controlling the flow of air over said condenser in response to said third sensor.

24. The heat pump of claim 19 wherein:

one of said first and second heat exchangers is an evaporator; and the other of said first and second heat exchangers is a condenser.

25. The heat pump of claim 24 including:

a third sensor for sensing the temperature of air from said condenser; and a flow controller for controlling the flow of air over said condenser in response to said third sensor.

26. The heat pump of claim 19 including:

a valve moveable from a first position to a second position to control the direction of flow of the refrigerant in said conduit loop;

said valve in a first position directing the flow of the refrigerant from said primary compressor to one of said heat exchangers functioning as a condenser, and from said condenser to said economizer and then to the other of said heat exchangers functioning as an evaporator; and said valve in a second position directing the flow of the refrigerant from said primary compressor to said other of said heat exchangers functioning as a condenser, and from said condenser to said economizer and then to said one of said heat exchangers functioning as an evaporator.

27. The heat pump of claim 19 wherein said medium is air or fluid.

28. The heat pump of claim 19 wherein:

said primary compressor is a one speed compressor; and said booster compressor is a variable speed or multispeed compressor.

29. A heat pump including:

a primary compressor;

a booster compressor;

first and second heat exchangers;

a flow conduit connecting said first and second heat exchange means and said primary compressor for circulating a refrigerant fluid in a closed loop, said booster compressor being upstream of said primary compressor in said loop;

an economizer connected in said flow conduit between said first and second heat exchangers;

a bleed connected from said flow conduit to said economizer to deliver a portion of the refrigerant fluid to said economizer for vaporization in heat exchange with the remaining portion of refrigerant fluid passing through said economizer;

an economizer vapor conduit connected from said economizer to said flow conduit upstream of the intake of said primary compressor;

an economizer flow controller in said bleed to control the flow of fluid from said bleed through said economizer and to said economizer vapor conduit;

a first sensor for sensing a parameter commensurate with the temperature of ambient outdoor air;

thermostat means for sensing the temperature of a fluid to be heated or cooled; and controller responsive to inputs from said first sensor and said thermostat means for controlling operation of said primary compressor and said booster compressor and said economizer, said controller being effective initially to operate said primary compressor in response to a first input signal from said thermostat while inhibiting operation of said booster compressor and said economizer flow controller, and said controller thereafter being effective to operate said booster compressor and said primary compressor upon receipt of a second signal from said thermostat means and receipt of a booster enabling signal commensurate with the temperature of ambient outdoor air, and said controller thereafter being effective to operate said economizer by controlling the flow of fluid from said bleed line and through said economizer flow controller to said economizer and to said economizer vapor conduit;

said flow conduit being connected to bypass said booster compressor and deliver fluid from one of said heat exchangers to said primary compressor when said booster compressor is inoperative, and said flow conduit being connected to deliver fluid from said one heat exchanger to said booster compressor and from said booster compressor to said primary compressor when operation of said booster compressor is initiated.

30. The heat pump of claim 29 wherein:

said first heat exchanger is an evaporator located in said flow conduit downstream of said economizer and upstream of said booster compressor and said primary compressor; and said second heat exchange is a condenser located in said flow conduit downstream of said primary compressor and upstream of said economizer.

31. The heat pump of claim 29 wherein:

said first heat exchanger is an evaporator serving as an outdoor coil located in said flow conduit downstream of said economizer and upstream of said booster compressor, said evaporator receiving a flow of outdoor ambient air; and said second heat exchanger is a condenser serving as an indoor coil located in said flow conduit downstream of said primary compressor and upstream of said economizer, said condenser receiving a flow of air to be conditioned; and further including a second sensor for sensing the temperature of air from said condenser; and a flow controller for controlling the flow of air over said condenser in response to said second sensor.

32. The heat pump of claim 29 wherein:

one of said first and second heat exchangers is an evaporator; and the other of said first and second heat exchangers is a condenser.

33. The heat pump of claim 32, including:

a second sensor for sensing the temperature of air from said condenser; and a flow controller for controlling the flow of air over said condenser in response to said second sensor.

34. The heat pump of claim 29, including:

a valve moveable from a first position to a second position to control the direction of flow of refrigerant fluid in said closed loop;

said valve in a first position directing the flow of refrigerant fluid from said primary compressor to one of said heat exchangers functioning as a condenser, and from said condenser to said economizer and then to the other of said heat exchangers functioning as an evaporator; and said valve in a second position directing the flow of refrigerant fluid from said primary compressor to said other of said heat exchangers functioning as a condenser, and from said condenser to said economizer and then to said one of said heat exchangers functioning as an evaporator.

35. The heat pump of claim 29 wherein:

said controller is connected to said booster compressor to inhibit operation of said booster compressor until outdoor ambient temperature drops to a first predetermined level and said controller is connected to said economizer flow controller to inhibit operation of said economizer flow controller until the outdoor ambient temperature reaches a second predetermined level below said first predetermined level.

36. The heat pump of claim 35 wherein:

said economizer flow controller is normally fully closed to prevent flow of fluid from said bleed to said economizer means; and said economizer flow controller responds to a signal from said controller to move to a fully open position.

37. The heat pump of claim 35 wherein:

said economizer flow controller is normally fully closed to prevent flow of fluid from said bleed to said economizer; and said economizer is modulated between the closed position thereof and a fully open position in response to signals from said controller.

38. The heat pump of claim 29 wherein:

said primary compressor is a one speed compressor; and said booster compressor is a variable speed or multispeed compressor.

39. The heat pump of claim 29 wherein:

said primary compressor is a one speed compressor and said booster compressor is a two speed compressor; and said controller is effective to permit operation of said primary compressor when the outdoor ambient temperature falls to a first predetermined level while inhibiting operation of said booster compressor and said economizer means; and said controller is effective to continue operation of said primary compressor and to operate said booster compressor at the low speed thereof when outdoor ambient temperature falls to a second predetermined level below said first predetermined level while continuing to inhibit operation of said economizer means; and said controller is effective to continue operation of said primary compressor and said booster compressor at low speed and to operate said economizer when outdoor ambient temperature falls to a third predetermined level below said second predetermined level; and said controller is effective to continue operation of said primary compressor and to operate said booster compressor at the high speed thereof and to discontinue operation of said economizer when outdoor ambient temperature falls to a fourth predetermined level below said third predetermined level; and said control means is effective to continue operation of said primary compressor and to continue operation of said booster compressor at the high speed thereof and to reinitiate operation of said economizer when the outdoor ambient temperature falls to a fifth predetermined level below said fourth predetermined level.

40. A heat pump including:

a primary compressor;

a booster compressor;

first and second heat exchangers;

a flow conduit connecting said first and second heat exchange means, and said primary compressor for circulating a refrigerant fluid in a closed loop, said booster compressor being upstream of said primary compressor in said loop;

an economizer connected in said flow conduit between said first and second heat exchangers;

a bleed connected from said flow conduit to said economizer to deliver a portion of the refrigerant fluid to said economizer for vaporization in heat exchange with the remaining portion of refrigerant fluid passing through said economizer;

an economizer vapor conduit connected from said economizer to said flow conduit upstream of the intake of said primary compressor;

an economizer flow controller in said bleed to control the flow of fluid from said bleed through said economizer and to said economizer vapor conduit;

a first sensor for sensing the temperature of ambient outdoor air;

a second sensor for sensing a parameter commensurate with power input to said booster compressor;

a thermostat for sensing the temperature of a fluid to be heated or cooled; and a controller responsive to inputs from said first sensor and said thermostat for controlling operation of said primary compressor and said booster compressor and said economizer, said controller being effective initially to operate said primary compressor in response to a first input signal from said thermostat while inhibiting operation of said booster compressor and said economizer flow controller, and said controller thereafter being effective to operate said booster compressor and said primary compressor upon receipt of a second signal from said thermostat and receipt of a booster enabling signal commensurate with the temperature of ambient outdoor air, said control means thereafter being effective to operate said economizer means by operating said economizer flow controller to control the flow of fluid from said bleed line and through said economizer to said economizer vapor conduit;

said flow conduit being connected to bypass said booster compressor and deliver fluid from one of said heat exchangers to said primary compressor when said booster compressor is inoperative, and said flow conduit being connected to deliver fluid from said one heat exchanger to said booster compressor and from said booster compressor to said primary compressor when operation of said booster compressor is initiated.

41. The heat pump of claim 40 wherein:

said first heat exchanger is an evaporator located in said flow conduit downstream of said economizer and upstream of said booster compressor and said primary compressor; and said second heat exchange means is a condenser located in said flow conduit downstream of said primary compressor and upstream of said economizer.

42. The heat pump of claim 40 wherein:

said controller is effective to control operation of said booster compressor in accordance with a set point of said second sensor; and said controller is responsive to said first sensor to vary the level of said set point as a function of outdoor ambient temperature.

43. The heat pump of claim 40 wherein:

said first heat exchanger is an evaporator serving as an outdoor coil located in said flow conduit downstream of said economizer and upstream of said booster compressor, said evaporator receiving a flow of outdoor ambient air; and said second heat exchanger is a condenser serving as an indoor coil located in said flow conduit downstream of said primary compressor and upstream of said economizer, said evaporator receiving a flow of air to be conditioned; and further including a third sensor for sensing the temperature of air from said condenser; and an air flow controller for controlling the flow of air over said condenser in response to said third sensor.

44. The heat pump of claim 40 wherein:

one of said first and second heat exchangers is an evaporator; and the other of said first and second heat exchangers is a condenser.

45. The heat pump of claim 44, including:

a third sensor for sensing the temperature of air from said condenser; and an air flow controller for controlling the flow of air over said condenser in response to said third sensor.

46. The heat pump of claim 40 including:

a valve moveable from a first position to a second position to control the direction of flow of refrigerant fluid in said closed loop;

said valve in a first position directing the flow of refrigerant fluid from said primary compressor to one of said heat exchangers functioning as a condenser, and from said condenser to said economizer and then to the other of said exchangers means functioning as an evaporator; and said valve in a second position directing the flow of refrigerant fluid from said primary compressor to said other of said heat exchange means functioning as a condenser, and from said condenser to said economizer and then to said one of said exchangers means functioning as an evaporator.

47. The heat pump of claim 40 wherein:

said controller is connected to said booster compressor to inhibit operation of said booster compressor until outdoor ambient temperature drops to a first predetermined level, and said controller is connected to said economizer flow controller to inhibit operation of said economizer flow controller until the outdoor ambient temperature reaches a second predetermined level below said first predetermined level.

48. The heat pump of claim 47 wherein:

said economizer flow controller is normally fully closed to prevent flow of fluid from said bleed to said economizer; and said economizer flow controller responds to a signal from said controller to move to a fully open position.

49. The heat pump of claim 47 wherein:

said economizer flow controller is normally fully closed to prevent flow of fluid from said bleed to said economizer; and said economizer flow controller is modulated between the closed position thereof and a fully open position in response to signals from said controller.

50. The heat pump of claim 46 including:

a first modulating valve between said economizer and said one of said heat exchangers functioning as an evaporator to modulate the flow of refrigerant fluid from said economizer to said evaporator when said first modulating valve is in said first position thereof; and a second modulating valve between said economizer and said one of said heat exchangers functioning as an evaporator to modulate the flow of refrigerant fluid to said evaporator when said second modulating valve is in said second position thereof.

51. The heat pump of claim 34 wherein:

said primary compressor is a one speed compressor and said booster compressor is a two speed compressor; and said controller is effective to permit operation of said primary compressor when the outdoor ambient temperature falls to a first predetermined level while inhibiting operation of said booster compressor and said economizer means; and said controller is effective to continue operation of said primary compressor and to operate said booster compressor at the low speed thereof when outdoor ambient temperature falls to a second predetermined level below said first predetermined level while continuing to inhibit operation of said economizer means; and said controller is effective to continue operation of said primary compressor and said booster compressor at low speed and to operate said economizer when outdoor ambient temperature falls to a third predetermined level below said second predetermined level; and said controller is effective to continue operation of said primary compressor and to operate said booster compressor at the high speed thereof and to discontinue operation of said economizer when outdoor ambient temperature falls to a fourth predetermined level below said third predetermined level; and said controller is effective to continue operation of said primary compressor and to continue operation of said booster compressor at the high speed thereof and to reinitiate operation of said economizer when the outdoor ambient temperature falls to a fifth predetermined level below said fourth predetermined level.

52. The heat pump of claim 40 wherein:

said primary compressor is a single speed compressor, and said booster compressor is a one speed or two speed compressor.

53. A heat pump system including:

a primary compressor;

a booster compressor;

first and second heat exchangers;

a conduit loop connecting said first and second heat exchangers and said primary compressor for circulating a refrigerant therein, said booster compressor being upstream of said primary compressor in said conduit loop;

an economizer connected in said conduit loop between said first and second heat exchangers;

a first economizer conduit connecting said economizer and said conduit loop to deliver a portion of the refrigerant from said conduit loop to said economizer for vaporization, the remaining portion of the refrigerant passing through said economizer in said conduit loop;

a second economizer conduit connecting said economizer to said conduit loop upstream of the intake of said primary compressor to deliver refrigerant fluid vaporized in said economizer to said primary compressor;

a flow control element in said first economizer conduit to control the flow of fluid from said first economizer conduit to said economizer and to said second economizer conduit;

a first sensor for sensing a parameter commensurate with the temperature of ambient outdoor air;

a thermostat for sensing the temperature of a medium to be heated or cooled; and a controller responsive to inputs from said first sensor and said thermostat for controlling operation of said primary compressor, said booster compressor, and said economizer, said controller being effective initially to operate said primary compressor in response to a first input signal from said thermostat while inhibiting operation of said booster compressor and said economizer, and said controller thereafter being effective to operate said booster compressor and said primary compressor upon receipt of a second signal from said thermostat and receipt of a booster enabling signal commensurate with the temperature of ambient outdoor air, and said controller thereafter being effective to operate said economizer upon receipt of a signal from said first sensor to operate said flow control element to control the flow of fluid from said first economizer conduit through said economizer and to said second economizer conduit;

said conduit loop being connected to bypass said booster compressor and deliver the refrigerant from one of said first and second heat exchangers to said primary compressor when said booster compressor is inoperative, and said conduit loop being connected to deliver the refrigerant from said one heat exchanger to said booster compressor and from said booster compressor to said primary compressor when operation of said booster compressor is initiated.

54. The heat pump of claim 53 wherein:

said first heat exchanger is an evaporator located in said conduit loop downstream of said economizer and upstream of said booster compressor and said primary compressor; and said second heat exchanger is a condenser located in said conduit loop downstream of said primary compressor and upstream of said economizer.

55. The heat pump of claim 53 wherein:

said first heat exchanger is an evaporator serving as an outdoor coil located in said conduit loop downstream of said economizer and upstream of said booster compressor, said evaporator receiving a flow of outdoor ambient air; and said second heat exchanger is a condenser serving as an indoor coil located in said conduit loop downstream of said primary compressor and upstream of said economizer, said evaporator receiving a flow of air to be conditioned; and further including a second sensor for sensing the temperature of air from said condenser; and a flow controller for controlling the flow of air over said condenser in response to said third sensor.

56. The heat pump of claim 53 wherein:

one of said first and second heat exchangers is an evaporator; and the other of said first and second heat exchangers is a condenser.

57. The heat pump of claim 56 including:

a second sensor for sensing the temperature of air from said condenser; and a flow controller for controlling the flow of air over said condenser in response to said second sensor.

58. The heat pump of claim 53 including:

a valve moveable from a first position to a second position to control the direction of flow of the refrigerant in said conduit loop;

said valve in a first position directing the flow of the refrigerant from said primary compressor to one of said heat exchangers functioning as a condenser, and from said condenser to said economizer and then to the other of said heat exchangers functioning as an evaporator; and said valve in a second position directing the flow of the refrigerant from said primary compressor to said other of said heat exchangers functioning as a condenser, and from said condenser to said economizer and then to said one of said heat exchangers functioning as an evaporator.

59. The heat pump of claim 58 including:

a first modulating valve between said economizer and said one of said heat exchange means functioning as an evaporator to modulate the flow of refrigerant fluid from said economizer to said evaporator when said valve means is in said first position thereof; and a second modulating valve between said economizer and said one of said heat exchange means functioning as an evaporator to modulate the flow of refrigerant fluid to said evaporator when said valve means is in said second position thereof.

60. The heat pump of claim 53 wherein said medium is air or fluid.

61. The heat pump of claim 53 wherein:

said controller is connected to said booster compressor to inhibit operation of said booster compressor until outdoor ambient temperature drops to a first predetermined level and said controller is connected to said economizer flow controller to inhibit operation of said economizer until the outdoor ambient temperature reaches a second predetermined level below said first predetermined level.

62. The heat pump of claim 61 wherein:

said economizer flow controller is normally fully closed to prevent flow of fluid from said bleed means to said economizer means; and said economizer flow controller responds to a signal from said controller to move to a fully open position.

63. The heat pump of claim 61 wherein:

said economizer flow controller is normally fully closed to prevent flow of fluid from said bleed means to said economizer means; and said economizer flow controller is modulated between the closed position thereof and a fully open position in response to signals from said controller.

64. The heat pump of claim 53 wherein:

said primary compressor is a one speed compressor; and said booster compressor is a variable speed or multispeed compressor.

65. A heat pump including:

a primary compressor;

a booster compressor;

first and second heat exchangers;

a flow conduit connecting said first and second heat exchange means and said primary compressor for circulating a refrigerant fluid in a closed loop, said booster compressor being downstream of said primary compressor in said loop;

an economizer connected in said flow conduit between said first and second heat exchangers;

a bleed connected from said flow conduit to said economizer to deliver a portion of the refrigerant fluid to said economizer for vaporization in heat exchange with the remaining portion of refrigerant fluid passing through said economizer;

an economizer vapor conduit connected from said economizer to said flow conduit upstream of the intake of said primary compressor;

a first sensor for sensing a parameter commensurate with the temperature of ambient outdoor air;

a thermostat for sensing the temperature of a fluid to be heated or cooled;

a controller responsive to inputs from said first sensor means and said thermostat for controlling operation of said primary compressor and said booster compressor, said controller being effective initially to operate said primary compressor in response to a first input signal from said thermostat while inhibiting operation of said booster compressor, and said controller thereafter being effective to operate said booster compressor and said primary compressor upon receipt of a second signal from said thermostat and receipt of a booster enabling signal commensurate with the temperature of ambient outdoor air; and isolation means in said flow conduit for isolating said booster compressor from the discharge pressure from said primary compressor when operation of said booster compressor is inhibited;

said flow conduit being connected to deliver refrigerant fluid from one of said heat exchangers to said primary compressor and to bypass said booster compressor and deliver refrigerant fluid to the other of said heat exchangers when said booster compressor is inoperative, and said flow conduit being connected to deliver fluid from said one heat exchanger to said primary compressor and from said primary compressor to said booster compressor when operation of said booster compressor is initiated.

66. The heat pump of claim 65 wherein:

said primary compressor is a multispeed compressor, and said booster compressor is a one speed compressor or a two speed compressor.

67. The heat pump of claim 65 wherein:

said first heat exchanger is an evaporator located in said flow conduit downstream of said economizer means and upstream of said booster compressor and said primary compressor; and said second heat exchanger is a condenser located in said flow conduit downstream of said primary compressor and upstream of said economizer.

68. The heat pump of claim 65 wherein:

said controller is effective to control operation of said primary compressor in accordance with an outdoor ambient temperature sensed by said first sensor.

69. The heat pump of claim 65 wherein:

said first heat exchanger is an evaporator serving as an outdoor coil located in said flow conduit downstream of said economizer means and upstream of said booster compressor, said evaporator receiving a flow of outdoor ambient air; and said second heat exchanger is a condenser serving as an indoor coil located in said flow conduit downstream of said primary compressor and upstream of said economizer, said evaporator receiving a flow of air to be conditioned; and further including a second sensor for sensing the temperature of air from said condenser; and a flow controller for controlling the flow of air over said condenser in response to said second sensor.

70. The heat pump of claim 65 wherein:

one of said first and second heat exchanges is an evaporator; and the other of said first and second heat exchanges is a condenser.

71. The heat pump of claim 70, including:

second sensor means for sensing the temperature of air from said condenser; and a flow controller for controlling the flow of air over said condenser in response to said second sensor means.

72. The heat pump of claim 65, including:

a control valve moveable from a first position to a second position to control the direction of flow of refrigerant fluid in said closed loop;

said control valve in a first position directing the flow of refrigerant fluid from said primary compressor to one of said heat exchangers functioning as a condenser, and from said condenser to said economizer and then to the other of said heat exchangers functioning as an evaporator; and said control valve in a second position directing the flow of refrigerant fluid from said primary compressor to said other of said heat exchangers functioning as a condenser, and from said condenser to said economizer and then to said one of said heat exchangers functioning as an evaporator.

73. The heat pump of claim 65 wherein:

said controller is connected to said booster compressor to inhibit operation of said booster compressor until outdoor ambient temperature drops to a first predetermined level.

74. The heat pump of claim 65 wherein:

said controller is effective to vary the speed of said primary compressor as an inverse function of outdoor ambient temperature sensed by said first sensor when outdoor ambient temperature falls to a first predetermined level and outdoor ambient temperature is between said first predetermined level and a lower second predetermined level; and said controller is effective to initiate operation of said booster compressor and operate said primary compressor at low speed when outdoor ambient temperature falls to a said second predetermined level; and said controller is effective to continue operations of said booster compressor and to vary the speed of said primary compressor as an inverse function of outdoor ambient temperature sensed by said first sensor means when outdoor ambient temperature is lower than said second predetermined temperature.

75. The heat pump of claim 65 wherein:

said primary compressor is a variable speed compressor, and said booster compressor is a one speed compressor.

76. The heat pump of claim 65 wherein:

said primary compressor is a variable speed compressor, and said booster compressor is a two speed compressor.

77. The heat pump of claim 65 wherein said isolation means includes:

a two position valve in said flow conduit means;

said two position valve being effective in a first position thereof, when said booster compressor is inoperative, to block discharge flow from said primary compressor to said booster compressor; and said two position valve being effective in a second position thereof to deliver discharge flow from said primary compressor to said booster compressor.

78. The heat pump of claim 77 wherein:

said two position valve is effective in the first position thereof to deliver economizer vapor to said primary compressor.

79. The heat pump of claim 77 wherein:

said two position valve is moved from said first position thereof to said second position thereof in response to initiation of operation of said booster compressor.

80. The heat pump of claim 29 wherein:

said primary compressor is a one speed compressor and said booster compressor is a two speed compressor; and said controller is effective to permit operation of said primary compressor when the outdoor ambient temperature falls to a first predetermined level while inhibiting operation of said booster compressor and said economizer; and said controller is effective to continue operation of said primary compressor and to operate said booster compressor at the low speed thereof when outdoor ambient temperature falls to a second predetermined level below said first predetermined level while continuing to inhibit operation of said economizer; and said controller is effective to continue operation of said primary compressor and said booster compressor at low speed and to operate said economizer when outdoor ambient temperature falls to a third predetermined level below said second predetermined level; and said controller is effective to continue operation of said primary compressor and to operate said booster compressor at the high speed thereof and to discontinue operation of said economizer when outdoor ambient temperature falls to a fourth predetermined level below said third predetermined level; and said controller is effective to continue operation of said primary compressor and to continue operation of said booster compressor at the high speed thereof and to reinitiate operation of said economizer when the outdoor ambient temperature falls to a fifth predetermined level below said fourth predetermined level.

81. A heat pump including:

a primary compressor;

a booster compressor;

first and second heat exchange means;

flow conduit means connecting said first and second heat exchange means and said primary compressor for circulating a refrigerant fluid in a closed loop;

economizer means connected in said flow conduit means between said first and second heat exchangers;

bleed means connected from said flow conduit means to said economizer means to deliver a portion of the refrigerant fluid to said economizer means for vaporization in heat exchange with the remaining portion of refrigerant fluid passing through said economizer means;

conduit means connected from said economizer means to said flow conduit means upstream of the intake of said primary compressor;

first sensor means for sensing a parameter commensurate with the temperature of ambient outdoor air;

second sensor means for sensing a parameter of booster compressor operation commensurate with power input to said booster compressor;

thermostat means for sensing the temperature of a fluid to be heated or cooled;

control means responsive to inputs from said first sensor means, said second sensor means and said thermostat means for controlling operation of said primary compressor and said booster compressor, said control means functioning initially to operate said primary compressor in response to a first input signal from said thermostat means while maintaining said booster compressor inoperative, and thereafter functioning to operate said booster compressor and said primary compressor upon receipt of a second signal from said thermostat means and receipt of a booster enabling signal commensurate with the temperature of ambient outdoor air;

said flow conduit means being connected to bypass said booster compressor and deliver fluid from one of said heat exchangers to said primary compressor when said booster compressor is inoperative, and said flow conduit means being connected to deliver fluid from said one heat exchanger to said booster compressor and from said booster compressor to said primary compressor when operation of said booster compressor is initiated; and means for varying the pumping capacity of at least one of said primary and booster compressors in response to a signal from said first sensor means.

82. The heat pump of claim 81 wherein:

said control means is effective to control operation of said booster compressor in accordance with a set point parameter of booster compressor operation sensed by said second sensor means; and said control means is responsive to said first sensor means to vary the level of said set point of said parameter of booster compressor operation as a function of outdoor ambient temperature.

83. A heat pump including:

a primary compressor;

a booster compressor;

first and second heat exchangers;

a flow conduit connecting said first and second heat exchangers and said primary compressor for circulating a refrigerant fluid in a closed loop;

an economizer connected in said flow conduit between said first and second heat exchangers;

a bleed connected from said flow conduit to said economizer to deliver a portion of the refrigerant fluid to said economizer means for vaporization in heat exchange with the remaining portion of refrigerant fluid passing through said economizer;

an economizer conduit connected from said economizer means to said flow conduit means upstream of the intake of said primary compressor;

a first sensor for sensing a parameter commensurate with the temperature of ambient outdoor air;

a second sensor for sensing the pressure of refrigerant fluid at a point in said flow conduit means between said booster compressor and said primary compressor;

a thermostat for sensing the temperature of a fluid to be heated or cooled;

a controller responsive to inputs from said first sensor, said second sensor and said thermostat for controlling operation of said primary compressor and said booster compressor, said controller functioning initially to operate said primary compressor in response to a first input signal from said thermostat while maintaining said booster compressor inoperative, and thereafter functioning to operate said booster compressor and said primary compressor upon receipt of a second signal from said thermostat and receipt of a booster enabling signal from said second sensor;

said flow conduit being connected to bypass said booster compressor and deliver fluid from one of said heat exchangers to said primary compressor when said booster compressor is inoperative, and said flow conduit means being connected to deliver fluid from said one heat exchanger to said booster compressor and from said booster compressor to said primary compressor when operation of said booster compressor is initiated; and means for varying the pumping capacity of at least one of said primary and booster compressors in response to a signal from said first sensor.

84. The heat pump of claim 83 wherein:

said controller is effective to control operation of said booster compressor in accordance with a set point of said second sensor; and said controller is responsive to said first sensor to vary the level of said set point as a function of outdoor ambient temperature.

85. The heat pump of claim 83 wherein:

said primary compressor is a one speed compressor; and said booster compressor is a variable speed or multispeed compressor.

86. A heat pump including:

a primary compressor;

a booster compressor;

first and second heat exchangers;

a conduit loop connecting said first and second heat exchangers and said primary compressor for circulating a refrigerant therein;

an economizer connected in said conduit loop between said first and second heat exchangers;

a first economizer conduit connecting said economizer and said conduit loop to deliver a portion of the refrigerant from said conduit loop to said economizer for vaporization with the remaining portion of the refrigerant passing through said economizer;

a second economizer conduit connecting said economizer to said conduit loop upstream of the intake of said primary compressor;

a first sensor for sensing a parameter commensurate with the temperature of ambient outdoor air;

a second sensor for sensing a parameter of booster compressor operation commensurate with power input to said booster compressor;

a thermostat for sensing the temperature of a medium to be heated or cooled;

a controller responsive to inputs from said first sensor, said second sensor and said thermostat for controlling operation of said primary compressor and said booster compressor, said controller functioning initially to operate said primary compressor in response to a first input signal from said thermostat while maintaining said booster compressor inoperative, and thereafter functioning to operate said booster compressor and said primary compressor upon receipt of a second signal from said thermostat and receipt of a booster enabling signal commensurate with the temperature of ambient outdoor air;

said conduit loop being connected to bypass said booster compressor and deliver the refrigerant from one of said first and second heat exchangers to said primary compressor when said booster compressor is inoperative, and said conduit loop being connected to deliver the refrigerant from said one heat exchanger to said booster compressor and from said booster compressor to said primary compressor when operation of said booster compressor is initiated; and means for varying the pumping capacity of at least one of said primary and booster compressors in response to a signal from said first sensor.

87. The heat pump of claim 86 wherein:

said controller is effective to control operation of said booster compressor in accordance with a set point of said parameter of booster compressor operation sensed by said second sensor; and said controller is responsive to said first sensor to vary the level of said set point of said parameter of booster compressor operation as a function of outdoor ambient temperature.

88. The heat pump of claim 86 wherein:

said primary compressor is a one speed compressor; and said booster compressor is a variable speed or multispeed compressor.

89. A heat pump including:

a primary compressor;

a booster compressor;

first and second heat exchangers;

a flow conduit connecting said first and second heat exchange means and said primary compressor for circulating a refrigerant fluid in a closed loop, said booster compressor being upstream of said primary compressor in said loop;

an economizer connected in said flow conduit between said first and second heat exchangers;

a bleed connected from said flow conduit to said economizer to deliver a portion of the refrigerant fluid to said economizer for vaporization in heat exchange with the remaining portion of refrigerant fluid passing through said economizer;

an economizer vapor conduit connected from said economizer to said flow conduit upstream of the intake of said primary compressor;

an economizer flow controller in said bleed to control the flow of fluid from said bleed through said economizer and to said economizer vapor conduit;

a first sensor for sensing a parameter commensurate with the temperature of ambient outdoor air;

a thermostat for sensing the temperature of a fluid to be heated or cooled;

a controller responsive to inputs from said first sensor and said thermostat for controlling operation of said primary compressor and said booster compressor and said economizer, said controller being effective initially to operate said primary compressor in response to a first input signal from said thermostat while inhibiting operation of said booster compressor and said economizer flow controller, and said controller thereafter being effective to operate said booster compressor and said primary compressor upon receipt of a second signal from said thermostat and receipt of a booster enabling signal commensurate with the temperature of ambient outdoor air, and said controller thereafter being effective to operate said economizer by controlling the flow of fluid from said bleed line and through said economizer flow controller to said economizer and to said economizer vapor conduit;

said flow conduit being connected to bypass said booster compressor and deliver fluid from one of said heat exchangers to said primary compressor when said booster compressor is inoperative, and said flow conduit being connected to deliver fluid from said one heat exchanger to said booster compressor and from said booster compressor to said primary compressor when operation of said booster compressor is initiated; and means for varying the pumping capacity of at least one of said primary and booster compressors in response to a signal from said first sensor means.

90. The heat pump of claim 89 wherein:

said primary compressor is a one speed compressor; and said booster compressor is a variable speed or multispeed compressor.

91. The heat pump of claim 89 wherein:

said primary compressor is a one speed compressor and said booster compressor is a two speed compressor; and said controller is effective to permit operation of said primary compressor when the outdoor ambient temperature falls to a first predetermined level while inhibiting operation of said booster compressor and said economizer means; and said controller is effective to continue operation of said primary compressor and to operate said booster compressor at the low speed thereof when outdoor ambient temperature falls to a second predetermined level below said first predetermined level while continuing to inhibit operation of said economizer; and said controller is effective to continue operation of said primary compressor and said booster compressor at low speed and to operate said economizer when outdoor ambient temperature falls to a third predetermined level below said second predetermined level; and said controller is effective to continue operation of said primary compressor and to operate said booster compressor at the high speed thereof and to discontinue operation of said economizer when outdoor ambient temperature falls to a fourth predetermined level below said third predetermined level; and said controller is effective to continue operation of said primary compressor and to continue operation of said booster compressor at the high speed thereof and to reinitiate operation of said economizer when the outdoor ambient temperature falls to a fifth predetermined level below said fourth predetermined level.

92. The heat pump of claim 89 wherein:

said first heat exchanger is an evaporator located in said flow conduit means downstream of said economizer and upstream of said booster compressor and said primary compressor; and said second heat exchanger is a condenser located in said flow conduit downstream of said primary compressor and upstream of said economizer.

93. The heat pump of claim 89 wherein:

said first heat exchanger is an evaporator serving as an outdoor coil located in said flow conduit means downstream of said economizer and upstream of said booster compressor, said evaporator receiving a flow of outdoor ambient air; and said second heat exchanger is a condenser serving as an indoor coil located in said flow conduit downstream of said primary compressor and upstream of said economizer, said evaporator receiving a flow of air to be conditioned; and further including a second sensor for sensing the temperature of air from said condenser; and an air flow controller for controlling the flow of air over said condenser in response to said third sensor means.

94. The heat pump of claim 89 wherein:

one of said first and second heat exchangers is an evaporator; and the other of said first and second heat exchangers is a condenser.

95. The heat pump of claim 94, including:

a second sensor for sensing the temperature of air from said condenser; and an air flow controller for controlling the flow of air over said condenser in response to said second sensor.

96. The heat pump of claim 89, including:

a valve moveable from a first position to a second position to control the direction of flow of refrigerant fluid in said closed loop;

said valve in a first position directing the flow of refrigerant fluid from said primary compressor to one of said heat exchangers functioning as a condenser, and from said condenser to said economizer and then to the other of said heat exchangers functioning as an evaporator; and said valve in a second position directing the flow of refrigerant fluid from said primary compressor to said other of said heat exchangers functioning as a condenser, and from said condenser to said economizer and then to said one of said heat exchange functioning as an evaporator.

97. The heat pump of claim 89 wherein:

said controller is connected to said booster compressor to inhibit operation of said booster compressor until outdoor ambient temperature drops to a first predetermined level, and said controller is connected to said economizer flow controller to inhibit operation of said economizer flow controller until the outdoor ambient temperature reaches a second predetermined level below said first predetermined level.

98. The heat pump of claim 97 wherein:

said economizer flow controller is normally fully closed to prevent flow of fluid from said bleed to said economizer; and said economizer flow controller responds to a signal from said controller to move to a fully open position.

99. The heat pump of claim 97 wherein:

said economizer flow controller is normally fully closed to prevent flow of fluid from said bleed to said economizer; and said economizer is modulated between the closed position thereof and a fully open position in response to signals from said controller.

100. A heat pump including:

a primary compressor;

a booster compressor;

first and second heat exchange means;

flow conduit means connecting said first and second heat exchange means and said primary compressor for circulating a refrigerant fluid in a closed loop, said booster compressor being upstream of said primary compressor in said loop;

economizer means connected in said flow conduit means between said first and second heat exchangers;

bleed means connected from said flow conduit means to said economizer means to deliver a portion of the refrigerant fluid to said economizer means for vaporization in heat exchange with the remaining portion of refrigerant fluid passing through said economizer means;

economizer vapor conduit means connected from said economizer means to said flow conduit means upstream of the intake of said primary compressor;

economizer flow control means in said bleed means to control the flow of fluid from said bleed means through said economizer means and to said economizer vapor conduit means;

first sensor means for sensing the temperature of ambient outdoor air;

second sensor means for sensing a parameter commensurate with power input to said booster compressor;

thermostat means for sensing the temperature of a fluid to be heated or cooled;

control means responsive to inputs from said first sensor means and said thermostat means for controlling operation of said primary compressor and said booster compressor and said economizer means, said control means being effective initially to operate said primary compressor in response to a first input signal from said thermostat means while inhibiting operation of said booster compressor and said economizer flow control means, and said control means thereafter being effective to operate said booster compressor and said primary compressor upon receipt of a second signal from said thermostat means and receipt of a booster enabling signal commensurate with the temperature of ambient outdoor air, said control means thereafter being effective to operate said economizer means by operating said economizer flow control means to control the flow of fluid from said bleed line and through said economizer to said economizer vapor conduit means;

said flow conduit means being connected to bypass said booster compressor and deliver fluid from one of said heat exchangers to said primary compressor when said booster compressor is inoperative, and said flow conduit means being connected to deliver fluid from said one heat exchanger to said booster compressor and from said booster compressor to said primary compressor when operation of said booster compressor is initiated; and means for varying the pumping capacity of at least one of said primary and booster compressors in response to a signal from said first sensor means.

101. The heat pump of claim 100 wherein:

said primary compressor is a single speed compressor, and said booster compressor is a one speed or two speed compressor.

102. The heat pump of claim 100 wherein:

said primary compressor is a one speed compressor and said booster compressor is a two speed compressor; and said control means is effective to permit operation of said primary compressor when the outdoor ambient temperature falls to a first predetermined level while inhibiting operation of said booster compressor and said economizer means; and said control means is effective to continue operation of said primary compressor and to operate said booster compressor at the low speed thereof when outdoor ambient temperature falls to a second predetermined level below said first predetermined level while continuing to inhibit operation of said economizer means; and said control means is effective to continue operation of said primary compressor and said booster compressor at low speed and to operate said economizer when outdoor ambient temperature pulls to third predetermined level below said second predetermined level; and said control means is effective to continue operation of said primary compressor and to operate said booster compressor at the high speed thereof and to discontinue operation of said economizer when outdoor ambient temperature falls to a fourth predetermined level below said third predetermined level; and said control means is effective to continue operation of said primary compressor and to continue operation of said booster compressor at the high speed thereof and to reinitiate operation of said economizer when the outdoor ambient temperature falls to a fifth predetermined level below said fourth predetermined level.

103. The heat pump of claim 100 wherein:

said control means is effective to control operation of said booster compressor in accordance with a set point of said second sensor means; and said control means is responsive to said first sensor means to vary the level of said set point as a function of outdoor ambient temperature.

104. The heat pump of claim 100 wherein:

said first heat exchanger means is an evaporator serving as an outdoor coil located in said flow conduit means downstream of said economizer means and upstream of said booster compressor, said evaporator receiving a flow of outdoor ambient air; and said second heat exchanger means is a condenser serving as an indoor coil located in said flow conduit downstream of said primary compressor and upstream of said economizer, said evaporator receiving a flow of air to be conditioned; and further including second sensor means for sensing the temperature of air from said condenser; and flow control means for controlling the flow of air over said condenser in response to said second sensor means.

105. The heat pump of claim 100 including:

valve means moveable from a first position to a second position to control the direction of flow of refrigerant fluid in said closed loop;

said valve means in a first position directing the flow of refrigerant fluid from said primary compressor to one of said heat exchange means functioning as a condenser, and from said condenser to said economizer and then to the other of said heat exchange means functioning as an evaporator; and said valve means in a second position directing the flow of refrigerant fluid from said primary compressor to said other of said heat exchange means functioning as a condenser, and from said condenser to said economizer and then to said one of said heat exchange means functioning as an evaporator.

106. The heat pump of claim 105 including:

modulating valve means between said economizer and said one of said heat exchange means functioning as an evaporator to modulate the flow of refrigerant fluid from said economizer to said evaporator when said valve means is in said first position thereof; and modulating valve means between said economizer and said one of said heat exchange means functioning as an evaporator to modulate the flow of refrigerant fluid to said evaporator when said valve means is in said second position thereof.

107. The heat pump of claim 100 wherein:

said control means is connected to said booster compressor to inhibit operation of said booster compressor until outdoor ambient temperature drops to a first predetermined level, and said control means is connected to said economizer flow control means to inhibit operation of said economizer flow control means until the outdoor ambient temperature reaches a second predetermined level below said first predetermined level.

108. The heat pump of claim 107 wherein:

said economizer flow control means is normally fully closed to prevent flow of fluid from said bleed means to said economizer means; and said economizer flow control means responds to a signal from said control means to move to a fully open position.

109. The heat pump of claim 107 wherein:

said economizer flow control means is normally fully closed to prevent flow of fluid from said bleed means to said economizer means; and said economizer flow control means is modulated between the closed position thereof and a fully open position in response to signals from said control means.

110. The heat pump of claim 109 wherein:

said economizer flow controller is normally fully closed to prevent flow of fluid from said bleed means to said economizer means; and said economizer flow controller responds to a signal from said controller to move to a fully open position.

111. The heat pump of claim 110 wherein:

said economizer flow controller is normally fully closed to prevent flow of fluid from said bleed means to said economizer means; and said economizer flow controller is modulated between the closed position thereof and a fully open position in response to signals from said controller.

112. A heat pump system including:

a primary compressor;

a booster compressor;

first and second heat exchangers;

a conduit loop connecting said first and second heat exchangers and said primary compressor for circulating a refrigerant therein, said booster compressor being upstream of said primary compressor in said conduit loop;

an economizer connected in said conduit loop between said first and second heat exchangers;

a first economizer conduit connecting said economizer and said conduit loop to deliver a portion of the refrigerant from said conduit loop to said economizer for vaporization, the remaining portion of the refrigerant passing through said economizer in said conduit loop;

a second economizer conduit connecting said economizer to said conduit loop upstream of the intake of said primary compressor to deliver refrigerant fluid vaporized in said economizer to said primary compressor;

a flow control element in said first economizer conduit to control the flow of fluid from said first economizer conduit to said economizer and to said second economizer conduit;

a first sensor for sensing a parameter commensurate with the temperature of ambient outdoor air;

a thermostat for sensing the temperature of a medium to be heated or cooled;

a controller responsive to inputs from said first sensor and said thermostat for controlling operation of said primary compressor, said booster compressor, and said economizer, said controller being effective initially to operate said primary compressor in response to a first input signal from said thermostat while inhibiting operation of said booster compressor and said economizer, and said controller thereafter being effective to operate said booster compressor and said primary compressor upon receipt of a second signal from said thermostat and receipt of a booster enabling signal commensurate with the temperature of ambient outdoor air, and said controller thereafter being effective to operate said economizer upon receipt of a signal from said first sensor to operate said flow control element to control the flow of fluid from said first economizer conduit through said economizer and to said second economizer conduit;

said conduit loop being connected to bypass said booster compressor and deliver the refrigerant from one of said first and second heat exchangers to said primary compressor when said booster compressor is inoperative, and said conduit loop being connected to deliver the refrigerant from said one heat exchanger to said booster compressor and from said booster compressor to said primary compressor when operation of said booster compressor is initiated; and means for varying the pumping capacity of at least one of said primary and booster compressors in response to a signal from said first sensor.

113. The heat pump of claim 112 wherein:

said primary compressor is a one speed compressor; and said booster compressor is a variable speed or multispeed compressor.

114. The heat pump of claim 112 wherein:

said first heat exchanger is an evaporator located in said conduit loop downstream of said economizer and upstream of said booster compressor and said primary compressor; and said second heat exchanger is a condenser located in said conduit loop downstream of said primary compressor and upstream of said economizer.

115. The heat pump of claim 112 wherein:

said first heat exchanger is an evaporator serving as an outdoor coil located in said conduit loop downstream of said economizer and upstream of said booster compressor, said evaporator receiving a flow of outdoor ambient air; and said second heat exchanger is a condenser serving as an indoor coil located in said conduit loop downstream of said primary compressor and upstream of said economizer, said evaporator receiving a flow of air to be conditioned; and further including a second sensor for sensing the temperature of air from said condenser; and a flow controller for controlling the flow of air over said condenser in response to said third sensor.

116. The heat pump of claim 112 wherein:

one of said first and second heat exchangers is an evaporator; and the other of said first and second heat exchangers is a condenser.

117. The heat pump of claim 112 including:

a valve moveable from a first position to a second position to control the direction of flow of the refrigerant in said conduit loop;

said valve in a first position directing the flow of the refrigerant from said primary compressor to one of said heat exchangers functioning as a condenser, and from said condenser to said economizer and then to the other of said heat exchangers functioning as an evaporator; and said valve in a second position directing the flow of the refrigerant from said primary compressor to said other of said heat exchangers functioning as a condenser, and from said condenser to said economizer and then to said one of said heat exchangers functioning as an evaporator.

118. The heat pump of claim 117 including:

a first modulating valve between said economizer and said one of said heat exchange means functioning as an evaporator to modulate the flow of refrigerant fluid from said economizer to said evaporator when said valve is in said first position thereof; and a second modulating valve between said economizer and said one of said heat exchange means functioning as an evaporator to modulate the flow of refrigerant fluid to said evaporator when said valve is in said second position thereof.

119. The heat pump of claim 112 wherein:

said controller is connected to said booster compressor to inhibit operation of said booster compressor until outdoor ambient temperature drops to a first predetermined level, and said controller is connected to said economizer flow controller to inhibit operation of said economizer until the outdoor ambient temperature reaches a second predetermined level below said first predetermined level.

120. A heat pump including:

a primary compressor;

a booster compressor;

first and second heat exchangers;

a flow conduit connecting said first and second heat exchangers, and said primary compressor for circulating a refrigerant fluid in a closed loop, said booster compressor being downstream of said primary compressor in said loop;

an economizer connected in said flow conduit means between said first and second heat exchangers;

a bleed connected from said flow conduit means to said economizer to deliver a portion of the refrigerant fluid to said economizer for vaporization in heat exchange with the remaining portion of refrigerant fluid passing through said economizer;

a economizer vapor conduit connected from said economizer to said flow means upstream of the intake of said primary compressor;

a first sensor for sensing a parameter commensurate with the temperature of ambient outdoor air;

a thermostat for sensing the temperature of a fluid to be heated or cooled;

a controller responsive to inputs from said first sensor and said thermostat for controlling operation of said primary compressor and said booster compressor, said controller being effective initially to operate said primary compressor in response to a first input signal from said thermostat while inhibiting operation of said booster compressor, and said controller thereafter being effective to operate said booster compressor and said primary compressor upon receipt of a second signal from said thermostat and receipt of a booster enabling signal commensurate with the temperature of ambient outdoor air;

isolation means in said flow conduit for isolating said booster compressor from the discharge pressure from said primary compressor when operation of said booster compressor is inhibited;

said flow conduit being connected to deliver refrigerant fluid from one of said heat exchangers to said primary compressor and to bypass said booster compressor and deliver refrigerant fluid to the other of said heat exchangers when said booster compressor is inoperative, and said flow conduit being connected to deliver fluid from said one heat exchanger to said primary compressor and from said primary compressor to said booster compressor when operation of said booster compressor is initiated; and means for varying the pumping capacity of at least one of said primary and booster compressors in response to a signal from said first sensor means.

121. The heat pump of claim 120 wherein:

said primary compressor is a multispeed compressor, and said booster compressor is a one speed compressor or a two speed compressor.

122. The heat pump of claim 120 wherein:

said first heat exchanger is an evaporator located in said flow conduit downstream of said economizer means and upstream of said booster compressor and said primary compressor; and said second heat exchanger is a condenser located in said flow conduit downstream of said primary compressor and upstream of said economizer.

123. The heat pump of claim 120 wherein:

said controller is effective to control operation of said primary compressor in accordance with an outdoor ambient temperature sensed by said first sensor.

124. The heat pump of claim 120 wherein:

said first heat exchanger is an evaporator serving as an outdoor coil located in said flow conduit means downstream of said economizer and upstream of said booster compressor, said evaporator receiving a flow of outdoor ambient air; and said second heat exchanger is a condenser serving as an indoor coil located in said flow conduit downstream of said primary compressor and upstream of said economizer, said condenser receiving a flow of air to be conditioned; and further including a second sensor for sensing the temperature of air from said condenser; and a flow control for controlling the flow of air over said condenser in response to said third sensor.

125. The heat pump of claim 120 wherein:

one of said first and second heat exchangers is an evaporator; and the other of said first and second heat exchangers is a condenser.

126. The heat pump of claim 125, including:

a second sensor for sensing the temperature of air from said condenser; and a flow control for controlling the flow of air over said condenser in response to said second sensor.

127. The heat pump of claim 120, including:

a valve moveable from a first position to a second position to control the direction of flow of refrigerant fluid in said closed loop;

said valve in a first position directing the flow of refrigerant fluid from said primary compressor to one of said heat exchangers functioning as a condenser, and from said condenser to said economizer and then to the other of said heat exchangers functioning as an evaporator; and said valve in a second position directing the flow of refrigerant fluid from said primary compressor to said other of said heat exchangers functioning as a condenser, and from said condenser to said economizer and then to said one of said heat exchangers functioning as an evaporator.

128. The heat pump of claim 120 wherein:

said controller is connected to said booster compressor to inhibit operation of said booster compressor until outdoor ambient temperature drops to a first predetermined level.

129. The heat pump of claim 120 wherein:

said controller is effective to vary the speed of said primary compressor as an inverse function of outdoor ambient temperature sensed by said first sensor when outdoor ambient temperature falls to a first predetermined level and outdoor ambient temperature is between said first predetermined level and a lower second predetermined level; and said controller is effective to initiate operation of said booster compressor and operate said primary compressor at low speed when outdoor ambient temperature falls to a said second predetermined level; and said controller is effective to continue operations of said booster compressor and to vary the speed of said primary compressor as an inverse function of outdoor ambient temperature sensed by said first sensor when outdoor ambient temperature is lower than said second predetermined temperature.

130. The heat pump of claim 120 wherein:

said primary compressor is a variable speed compressor, and said booster compressor is a one speed compressor.

131. The heat pump of claim 120 wherein:

said primary compressor is a variable speed compressor, and said booster compressor is a two speed compressor.

132. The heat pump of claim 120 wherein said isolation means includes:

a two position valve in said flow conduit;

said two position valve being effective in a first position thereof, when said booster compressor is inoperative, to block discharge flow from said primary compressor to said booster compressor; and said two position valve being effective in a second position thereof to deliver discharge flow from said primary compressor to said booster compressor.

133. The heat pump of claim 132 wherein:

said two position valve is effective in the first position thereof to deliver economizer vapor to said primary compressor.

134. The heat pump of claim 132 wherein:

said two position valve is moved from said first position thereof to said second position thereof in response to initiation of operation of said booster compressor.

135. The heat pump of claim 89 wherein:

said primary compressor is a one speed compressor and said booster compressor is a two speed compressor; and said controller is effective to permit operation of said primary compressor when the outdoor ambient temperature falls to a first predetermined level while inhibiting operation of said booster compressor and said economizer; and said controller is effective to continue operation of said primary compressor and to operate said booster compressor at the low speed thereof when outdoor ambient temperature falls to a second predetermined level below said first predetermined level while continuing to inhibit operation of said economizer means; and said controller is effective to continue operation of said primary compressor and said booster compressor at low speed and to operate said economizer when outdoor ambient temperature falls to a third predetermined level below said second predetermined level; and said controller is effective to continue operation of said primary compressor and to operate said booster compressor at the high speed thereof and to discontinue operation of said economizer when outdoor ambient temperature falls to a fourth predetermined level below said third predetermined level; and said controller is effective to continue operation of said primary compressor and to continue operation of said booster compressor at the high speed thereof and to reinitiate operation of said economizer when the outdoor ambient temperature falls to a fifth predetermined level below said fourth predetermined level.

* * * * *